(12) United States Patent
Suzuki et al.

(10) Patent No.: US 12,063,104 B2
(45) Date of Patent: Aug. 13, 2024

(54) TERMINAL APPARATUS, BASE STATION APPARATUS AND COMMUNICATION METHOD

(71) Applicants: SHARP KABUSHIKI KAISHA, Osaka (JP); FG Innovation Company Limited, Tuen Mun (HK)

(72) Inventors: Shoichi Suzuki, Osaka (JP); Tomoki Yoshimura, Osaka (JP); Toshizo Nogami, Osaka (JP); Wataru Ouchi, Osaka (JP); Taewoo Lee, Osaka (JP); Hui-Fa Lin, Osaka (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 641 days.

(21) Appl. No.: 17/270,431

(22) PCT Filed: Aug. 22, 2019

(86) PCT No.: PCT/JP2019/032913
§ 371 (c)(1),
(2) Date: Apr. 6, 2021

(87) PCT Pub. No.: WO2020/040267
PCT Pub. Date: Feb. 27, 2020

(65) Prior Publication Data
US 2021/0242955 A1 Aug. 5, 2021

(30) Foreign Application Priority Data
Aug. 23, 2018 (JP) .................. 2018-156353

(51) Int. Cl.
*H04J 11/00* (2006.01)
*H04L 27/26* (2006.01)
(Continued)

(52) U.S. Cl.
CPC ...... *H04J 11/0079* (2013.01); *H04L 27/2613* (2013.01); *H04W 72/0453* (2013.01); *H04W 72/23* (2023.01); *H04L 27/2607* (2013.01)

(58) Field of Classification Search
CPC ............... H04L 27/2601; H04L 5/0053; H04L 27/2613; H04L 5/0037; H04L 27/2607;
(Continued)

(56) References Cited

U.S. PATENT DOCUMENTS

2013/0128847 A1  5/2013  Wang et al.
2013/0194931 A1  8/2013  Lee et al.
(Continued)

FOREIGN PATENT DOCUMENTS

CN  103081389 A  5/2013
CN  106686735 A  5/2017
(Continued)

OTHER PUBLICATIONS

WI rapporteur (Ericsson), "RAN1 agreements for Rel-13 eMTC sorted and edited by topic", 3GPP TSG RAN WG1 Meeting #83, R1-157733, Anaheim, USA, Nov. 15-22, 2015, Section 18.5, p. 17.
(Continued)

*Primary Examiner* — Oussama Roudani
(74) *Attorney, Agent, or Firm* — ScienBiziP, P.C.

(57) ABSTRACT

The present invention can perform communication efficiently. In a case that (1) the terminal apparatus is configured to monitor a first PDCCH candidate in a CSS and a second PDCCH candidate in a USS according to a DCI format with a C-RNTI, (2) a set of resource elements constituting the first PDCCH candidate is the same as a set of resource elements constituting the second PDCCH candidate, (3) a higher layer parameter is not set, and/or (4) the size of the DCI format corresponding to the first PDCCH candidate is the same as the size of the DCI format corresponding to the
(Continued)

second PDCCH candidate, a terminal apparatus regards that a PDCCH with the DCI format is transmitted or received in the first PDCCH candidate when the PDCCH with the DCI format is received in the second PDCCH candidate.

15 Claims, 13 Drawing Sheets

(51) Int. Cl.
*H04W 72/0453* (2023.01)
*H04W 72/23* (2023.01)

(58) Field of Classification Search
CPC .............. H04L 5/0042; H04W 72/23; H04W 72/0453; H04W 72/20; H04J 11/0079
See application file for complete search history.

(56) References Cited

U.S. PATENT DOCUMENTS

| | | | |
|---|---|---|---|
| 2014/0105154 A1* | 4/2014 | Yang | H04L 5/0053 370/329 |
| 2017/0086220 A1* | 3/2017 | Kim | H04L 5/0053 |
| 2017/0303251 A1* | 10/2017 | Ko | H04W 88/02 |
| 2018/0049176 A1 | 2/2018 | Park et al. | |
| 2018/0077643 A1 | 3/2018 | Dinan | |
| 2019/0208436 A1* | 7/2019 | Zhou | H04B 7/088 |
| 2020/0037245 A1* | 1/2020 | Lu | H04W 72/23 |

FOREIGN PATENT DOCUMENTS

| | | |
|---|---|---|
| CN | 108270514 A | 7/2018 |
| JP | 2013-539268 A | 10/2013 |

OTHER PUBLICATIONS

3GPP TS 38.211, "3rd Generation Partnership Project; Technical Specification Group Radio Access Network; NR; Physical channels and modulation (Release 15)", V15.2.0 (Jun. 2018).
3GPP TS 38.212, "3rd Generation Partnership Project; Technical Specification Group Radio Access Network; NR; Multiplexing and channel coding (Release 15)", V15.2.0 (Jun. 2018).
3GPP TS 38.213, "3rd Generation Partnership Project; Technical Specification Group Radio Access Network; NR; Physical layer procedures for control (Release 15)", V15.2.0 (Jun. 2018).
3GPP TS 38.214, "3rd Generation Partnership Project; Technical Specification Group Radio Access Network; NR; Physical layer procedures for data (Release 15)", V15.2.0 (Jun. 2018).
Ericsson, "Outcome of offline discussion on 7.1.3.1.4 (DCI content)—part II" [online], 3GPP TSG RAN WGI #93 RI-1807738, May 24, 2018.
Ericsson, "Summary of 7.1.3.1.4 (DCI contents and formats)" [online], 3GPP TSG RAN WGI #926 RI-1805504, Apr. 18, 2018.
Huawei, Hisilicon, "Remaining issues on DCI contents and formats" [online], 3GPP TSG RAN WGI #926 RI-1803707, Apr. 6, 2018.
VIVO, "Remaining issues on eMBB DCI format", R1-1806058, 3GPP TSG RAN WG1 Meeting #93, Busan, Korea, May 21-25, 2018 (May 12, 2018).
Nokia et al., "On the alignment of DCI format sizes", R1-1804614, 3GPP TSG RAN WG1 Meeting #92bis, Sanya, China, Apr. 16-Apr. 20, 2018 (Apr. 7, 2018).

* cited by examiner

| Number of Bits of "Frequency Domain Resource Assignment" Field | $N^{DL, BWP}$ or $N^{UL, BWP}$ |
|---|---|
| 5 | 6-7 |
| 6 | 8-10 |
| 7 | 11-15 |
| 8 | 16-22 |
| 9 | 23-31 |
| 10 | 32-44 |
| 11 | 45-63 |
| 12 | 64-90 |
| 13 | 91-127 |
| 14 | 128-180 |
| 15 | 181-255 |
| 16 | 256-276 |

FIG. 8

| DCI format 1_0 900 | 'Identifier for DCI formats' field – 1 bit | 'Frequency domain resource assignment' field – 13 bits | Other fields – 27 bits | |
| --- | --- | --- | --- | --- |
| DCI format 1_0 901 | 'Identifier for DCI formats' field – 1 bit | 'Frequency domain resource assignment' field – 13 bits | Other fields – 27 bits | |
| DCI format 0_0 902 | 'Identifier for DCI formats' field – 1 bit | 'Frequency domain resource assignment' field – 11 bits | Other fields – 19 bits | Padding – 10 bits |
| DCI format 0_0 903 | 'Identifier for DCI formats' field – 1 bit | 'Frequency domain resource assignment' field – 13 bits | Other fields – 19 bits | Padding – 8 bits |

FIG. 9

- If $(L_{UL\_RBs} - 1) \leq floor(N_{BWP}^{size}/2)$ then
    - $RIV0\_0 = N_{BWP}^{size}(L_{UL\_RBs} - 1) + RB_{start}$
- Else
    - $RIV0\_0 = N_{BWP}^{size}(N_{BWP}^{size} - L_{UL\_RBs} + 1) + (N_{BWP}^{size} - 1 - RB_{UL\_start})$ where
- $L_{UL\_RBs} \geq 1$ and where $L_{UL\_RBs}$ shall not exceed $N_{BWP}^{size} - RB_{UL\_start}$

FIG. 10

- If $(L'_{UL\_RBs} - 1) \leq floor(N_{BWP}^{initial} / 2)$ then
    - $RIV0\_0 = N_{BWP}^{initial} (L'_{UL\_RBs} - 1) + RB'_{UL\_start}$
- Else
    - $RIV0\_0 = N_{BWP}^{initial} (N_{BWP}^{initial} - L'_{UL\_RBs} + 1) + (N_{BWP}^{initial} - 1 - RB'_{UL\_start})$ where

- $L'_{UL\_RBs} = L_{UL\_RBs} / K$ and where $L'_{UL\_RBs}$ shall not exceed $N_{BWP}^{initial} - RB'_{UL\_start}$
- $RB'_{UL\_start} = RB_{UL\_start} / K$,
- If $N_{BWP}^{active} > N_{BWP}^{initial}$, $K$ is the maximum value from set $\{1, 2, 4, 8\}$ which satisfies $K \leq floor(N_{BWP}^{active} / N_{BWP}^{initial})$;
- Otherwise $K = 1$.

FIG. 11

- If $(L_{DL\_RBs} - 1) \leq floor(N_{BWP}^{size} / 2)$ then

- $RIV1\_0 = N_{BWP}^{size} (L_{DL\_RBs} - 1) + RB_{start}$

- Else

- $RIV1\_0 = N_{BWP}^{size} (N_{BWP}^{size} - L_{DL\_RBs} + 1) + (N_{BWP}^{size} - 1 - RB_{DL\_start})$ where

- $L_{DL\_RBs} \geq 1$ and where $L_{DL\_RBs}$ shall not exceed $N_{BWP}^{size} - RB_{DL\_start}$

FIG. 12

If $(L'_{DL\_RBs} - 1) \leq floor(N_{BWP}^{initial} / 2)$ then $\quad RIV1\_0 = N_{BWP}^{initial} (L'_{DL\_RBs} - 1) + RB'_{DL\_start}$ Else $\quad RIV1\_0 = N_{BWP}^{initial} (N_{BWP}^{initial} - L'_{DL\_RBs} + 1) + (N_{BWP}^{initial} - 1 - RB'_{DL\_start})$ where $L'_{DL\_RBs} = L_{DL\_RBs} / K$ and where $L'_{DL\_RBs}$ shall not exceed $N_{BWP}^{initial} - RB'_{DL\_start}$ $RB'_{DL\_start} = RB_{DL\_start} / K$.

If $N_{BWP}^{active} > N_{BWP}^{initial}$, $K$ is the maximum value from set $\{1, 2, 4, 8\}$ which satisfies $K \leq floor(N_{BWP}^{active} / N_{BWP}^{initial})$;

Otherwise $K = 1$.

FIG. 13

TERMINAL APPARATUS, BASE STATION APPARATUS AND COMMUNICATION METHOD

FIELD

The present invention relates to a terminal apparatus, a base station apparatus, and a communication method. The present application claims priority based on Japanese Patent Application No. 2018-156353 filed in Japan on Aug. 23, 2018, the content of which is incorporated herein by reference.

BACKGROUND

A radio access scheme and a wireless network for cellular mobile communication (hereinafter, referred to as "Long Term Evolution (LTE: a registered trademark)" or "Evolved Universal Terrestrial Radio Access: EUTRA") have been studied in the 3rd Generation Partnership Project (3GPP) (non-patent documents 1, 2, 3, 4, and 5). In addition, a new radio access scheme (hereinafter, referred to as "New Radio (NR)") has been studied in 3GPP. In LTE, the base station apparatus is also referred to as an eNode B (evolved Node B). In NR, the base station apparatus is also referred to as a gNodeB. In LTE and NR, the terminal apparatus is also referred to as a UE (User Equipment). LTE and NR are cellular communication systems in which areas covered by a plurality of base station apparatuses are arranged in a cell-like configuration. A single base station apparatus may also manage multiple cells.

PDCCH, PUSCH, and PDSCH are used in the downlink of NR (non-patent documents 1, 2, 3, and 4). The PDCCH transmits downlink control information (DCI). DCI format 0_0 is used for scheduling of a PUSCH. DCI format 1_0 is used for scheduling of a PDSCH.

DOCUMENTS OF PRIOR ART

Non-Patent Documents

Non-patent document 1: "3GPP TS 38.211 V15.2.0 (2018-06), NR: Physical channels and modulation", 29 Jun., 2017.
Non-patent document 2: "3GPP TS 38.212 V15.2.0 (2018-06), NR: Multiplexing and channel coding", 29 Jun., 2017.
Non-patent document 3: "3GPP TS 38.213 V15.2.0 (2018-06), NR: Physical layer procedures for control", 29 Jun., 2017.
Non-patent document 4: "3GPP TS 38.214 V15.2.0 (2018-06), NR: Physical layer procedures for data", 29 Jun., 2017.

SUMMARY

Technical Problem

One aspect of the present invention provides a terminal apparatus, a communication method for the terminal apparatus, a base station apparatus, and a communication method for the base station apparatus. The terminal apparatus, the communication method for the terminal apparatus, the base station apparatus, and the communication method for the base station apparatus according to one aspect of the present invention are provided with a method for determining the size of information and/or a method for efficiently interpreting information.

Technical Solution (1) The embodiments of the present invention adopt the following solutions. That is, a first aspect of the present invention is a terminal apparatus that comprises at least one processor and a memory coupled to the at least one processor, the processor is configured to receive at least one PDCCH with a DCI format and receive a PDSCH corresponding to an RIV configured in a "frequency domain resource assignment" field of the DCI format, and the RIV is given at least based on a type of search space in which the PDCCH is detected: and in a case where (1) the terminal apparatus is configured to monitor a first PDCCH candidate in a CSS and a second PDCCH candidate in a USS according to the DCI format with C-RNTI. (2) a set of resource elements constituting the first PDCCH candidate is the same as a set of resource elements constituting the second PDCCH. (3) a higher layer parameter PDCCH-DMRS-Scrambling-ID is not configured, and/or (4) the size of the DCI format corresponding to the first PDCCH candidate is the same as the size of the DCI format corresponding to the second PDCCH candidate, the processor regards that the PDCCH with the DCI format is transmitted only in the first PDCCH candidate of the first PDCCH candidate and the second PDCCH candidate, or regards that the PDCCH with the DCI format is transmitted only in the second PDCCH candidate of the first PDCCH candidate and the second PDCCH candidate, or regards that the PDCCH with the DCI format is transmitted or received in the second PDCCH candidate when the processor receives the PDCCH with the DCI format in the first PDCCH candidate, or regards that the PDCCH with the DCI format is transmitted or received in the first PDCCH candidate when the processor receives the PDCCH with the DCI format in the second PDCCH candidate.

(2) A second aspect of the present invention is a base station apparatus that comprises at least one processor and a memory coupled to the at least one processor, the processor is configured to transmit at least one PDCCH with a DCI format and transmit a PDSCH corresponding to an RIV configured in a "frequency domain resource assignment" field of the DCI format, and the RIV is given at least based on a type of search space in which the PDCCH is detected: and in a case where (1) a terminal apparatus is configured to monitor a first PDCCH candidate in a CSS and a second PDCCH candidate in a USS according to the DCI format with C-RNTI. (2) a set of resource elements constituting the first PDCCH candidate is the same as a set of resource elements constituting the second PDCCH. (3) a higher layer parameter PDCCH-DMRS-Scrambling-ID is not configured, and/or (4) the size of the DCI format corresponding to the first PDCCH candidate is the same as the size of the DCI format corresponding to the second PDCCH candidate, the processor is configured to transmit the PDCCH with the DCI format only in the first PDCCH candidate of the first PDCCH candidate and the second PDCCH candidate, or transmit the PDCCH with the DCI format only in the second PDCCH candidate of the first PDCCH candidate and the second PDCCH candidate, or regard that the PDCCH with the DCI format is transmitted in the second PDCCH candidate when the processor transmits the PDCCH with the DCI format in the first PDCCH candidate, or regard that the PDCCH with the DCI format is transmitted in the first PDCCH candidate when the processor transmits the PDCCH with the DCI format in the second PDCCH candidate.

(3) A third aspect of the present invention is a communication method for a terminal apparatus, and the communication method comprises: receiving at least one PDCCH with a DCI format and receiving a PDSCH corresponding to an RIV configured in a "frequency domain resource assignment" field of the DCI format, wherein the RIV is given at least based on a type of search space in which the PDCCH is detected: and in a case where (1) the terminal apparatus is configured to monitor a first PDCCH candidate in a CSS and a second PDCCH candidate in a USS according to the DCI format with C-RNTI. (2) a set of resource elements constituting the first PDCCH candidate is the same as a set of resource elements constituting the second PDCCH, (3) a higher layer parameter PDCCH-DMRS-Scrambling-ID is not configured, and/or (4) the size of the DCI format corresponding to the first PDCCH candidate is the same as the size of the DCI format corresponding to the second PDCCH candidate, the communication method further comprises: regarding that the PDCCH with the DCI format is transmitted only in the first PDCCH candidate of the first PDCCH candidate and the second PDCCH candidate, or regarding that the PDCCH with the DCI format is transmitted only in the second PDCCH candidate of the first PDCCH candidate and the second PDCCH candidate, or regarding that the PDCCH with the DCI format is transmitted or received in the second PDCCH candidate when the PDCCH with the DCI format is received in the first PDCCH candidate, or regarding that the PDCCH with the DCI format is transmitted or received in the first PDCCH candidate when the PDCCH with the DCI format is received in the second PDCCH candidate.

(4) A fourth aspect of the present invention is a communication method for a base station apparatus, and the communication method comprises: transmitting at least one PDCCH with a DCI format and transmitting a PDSCH corresponding to an RIV configured in a "frequency domain resource assignment" field of the DCI format, wherein the RIV is given at least based on a type of search space in which the PDCCH is detected: and in a case where (1) the terminal apparatus is configured to monitor a first PDCCH candidate in a CSS and a second PDCCH candidate in a USS according to the DCI format with C-RNTI, (2) a set of resource elements constituting the first PDCCH candidate is the same as a set of resource elements constituting the second PDCCH, (3) a higher layer parameter PDCCH-DMRS-Scrambling-ID is not configured, and/or (4) the size of the DCI format corresponding to the first PDCCH candidate is the same as the size of the DCI format corresponding to the second PDCCH candidate, the communication method further comprises: transmitting the PDCCH with the DCI format only in the first PDCCH candidate of the first PDCCH candidate and the second PDCCH candidate, or transmitting the PDCCH with the DCI format only in the second PDCCH candidate of the first PDCCH candidate and the second PDCCH candidate, or regarding that the PDCCH with the DCI format is transmitted in the second PDCCH candidate when the PDCCH with the DCI format is transmitted in the first PDCCH candidate, or regarding that the PDCCH with the DCI format is transmitted in the first PDCCH candidate when the PDCCH with the DCI format is transmitted in the second PDCCH candidate.

Advantageous Effect

According to one aspect of the present invention, the terminal apparatus and the base station apparatus can perform communication efficiently.

BRIEF DESCRIPTION OF THE DRAWINGS

FIG. 8 is a diagram illustrating the correspondence between a frequency domain resource assignment field and $N^{DL,BWP}$, $N^{UL,BWP}$ according to the present embodiment.

FIG. 9 is a diagram illustrating an example of DCI format 0_0 and DCI format 1_0 according to the present embodiment.

FIG. 10 is a diagram illustrating a pseudo code for calculating RIV 0_0 according to the present embodiment.

FIG. 11 is a diagram illustrating a pseudo code for calculating RIV 0_0 according to the present embodiment.

FIG. 12 is a diagram illustrating a pseudo code for calculating RIV 1_0 according to the present embodiment.

FIG. 13 is a diagram illustrating a pseudo code for calculating RIV 1_0 according to the present embodiment.

DETAILED DESCRIPTION OF THE PREFERRED EMBODIMENTS

Hereinafter, the embodiments of the present invention will be described.

Figure 1:
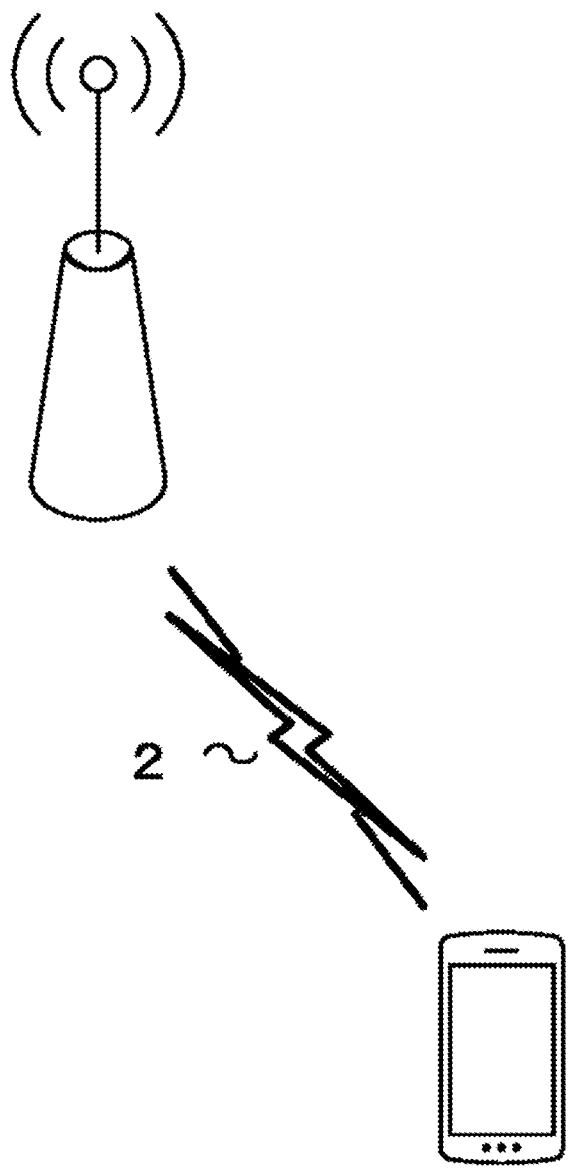
FIG. 1 is a conceptual diagram of a wireless communication system according to the present embodiment.

FIG. 1 is a conceptual diagram of a wireless communication system according to the present embodiment. In FIG. 1, a wireless communication system includes a terminal apparatus 1 and a base station apparatus 3.

Hereinafter, carrier aggregation will be described.

In the present embodiment, one or more of service cells may be configured in the terminal apparatus 1. A technology for the terminal apparatus 1 to communicate via a plurality of serving cells is referred to as cell aggregation or carrier aggregation. The present invention may be applied to each of the plurality of serving cells configured for the terminal apparatus 1. In addition, the present invention may also be applied to a portion of the plurality of serving cells that have been configured. The plurality of serving cells comprises at least one primary cell. The plurality of serving cells may also comprise one or more secondary cells. Hereinafter, the present embodiment is applied to one serving cell unless otherwise described.

The primary cell is a serving cell that has completed an initial connection establishment procedure, a serving cell that has initiated a connection re-establishment procedure, or a cell that is designated as a primary cell during a handover procedure. A secondary cell may be configured at or after a time point when an RRC (Radio Resource Control) connection is established.

In the downlink, a carrier corresponding to the serving cell is referred to as a downlink component carrier. In the uplink, a carrier corresponding to the serving cell is referred to as an uplink component carrier. The downlink component carrier and the uplink component carrier are collectively referred to as component carriers.

The terminal apparatus 1 can perform transmission and/or reception simultaneously through a plurality of physical channels in a plurality of serving cells (component carriers). One physical channel is transmitted in one serving cell (component carrier) of a plurality of serving cells (component carriers).

The physical channels and the physical signals according to the present embodiment will be described below.

In the uplink wireless communication from the terminal apparatus 1 to the base station apparatus 3, the following uplink physical channels are used. The uplink physical channels are used to transmit information outputted from a higher layer.

PUCCH (Physical Uplink Control Channel)
PUSCH (Physical Uplink Shared Channel)
PRACH (Physical Random Access Channel)

The PUCCH is configured to transmit CSI (Channel State Information) of the downlink and/or HARQ-ACK (Hybrid Automatic Repeat reQuest). The CSI and HARQ-ACK are uplink control information (UCI).

The PUSCH is configured to transmit uplink data (transport block, Uplink Shared Channel: UL-SCH), CSI of the downlink, and/or HARQ-ACK. The CSI and HARQ-ACK are uplink control information (UCI). The terminal apparatus 1 may transmit the PUSCH based on detection of a PDCCH (Physical Downlink Control Channel) including an uplink grant.

The PRACH is configured to transmit a random access preamble.

In the uplink wireless communication, the following uplink physical signal is used. The uplink physical signal is not used to transmit information output from a higher layer, but is used by the physical layer.

DMRS (Demodulation Reference Signal)

The DMRS is associated with the transmission of the PUCCH or PUSCH. The DMRS may be time-multiplexed with the PUSCH. The base station apparatus 3 may use DRMS to perform correction of the transmission path of the PUSCH.

In the downlink wireless communication from the base station apparatus 3 to the terminal apparatus 1, the following downlink physical channels are used. The downlink physical channels are used to transmit information outputted from a higher layer.

PDCCH (Physical Downlink Control Channel)
PDSCH (Physical Downlink Shared Channel)

The PDCCH is configured to transmit downlink control information (DCI). The downlink control information is also referred to as a DCI format.

The PDSCH is configured to transmit downlink data (transport block, Downlink-Shared Channel: DL-SCH).

The UL-SCH and DL-SCH are transport channels. A channel used in a medium access control (MAC) layer is referred to as a transport channel. In addition, the unit of a transport channel used in the MAC layer is referred to as a transport block (TB) or a MAC PDU (Protocol Data Unit).

Hereinafter, the configuration of a radio frame according to the present embodiment will be described.

Figure 2:
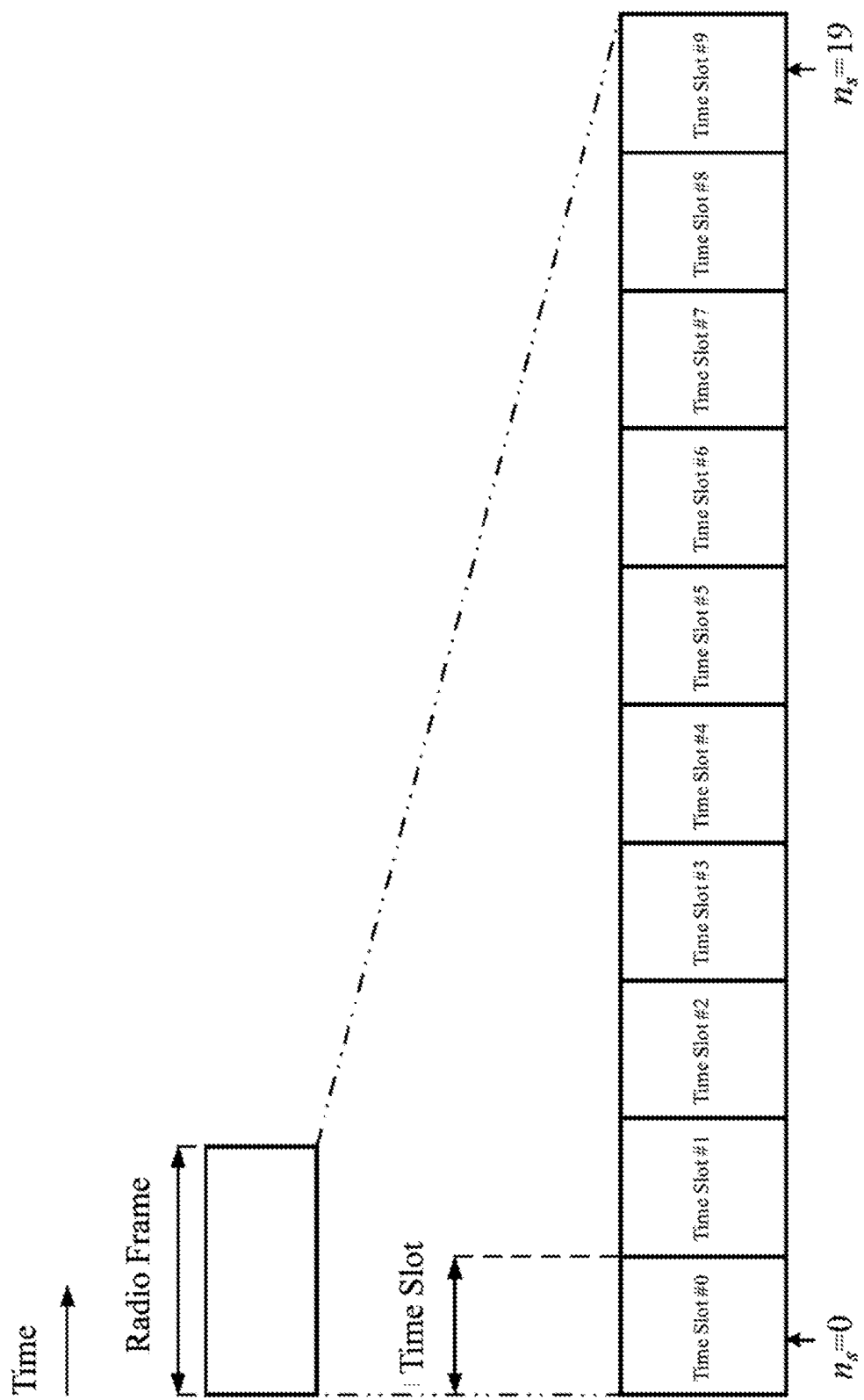
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. The length of each radio frame may be 10 ms. Besides, the radio frame may include 10 time slots. The length of each time slot may be 1 ms.

Figure 3:
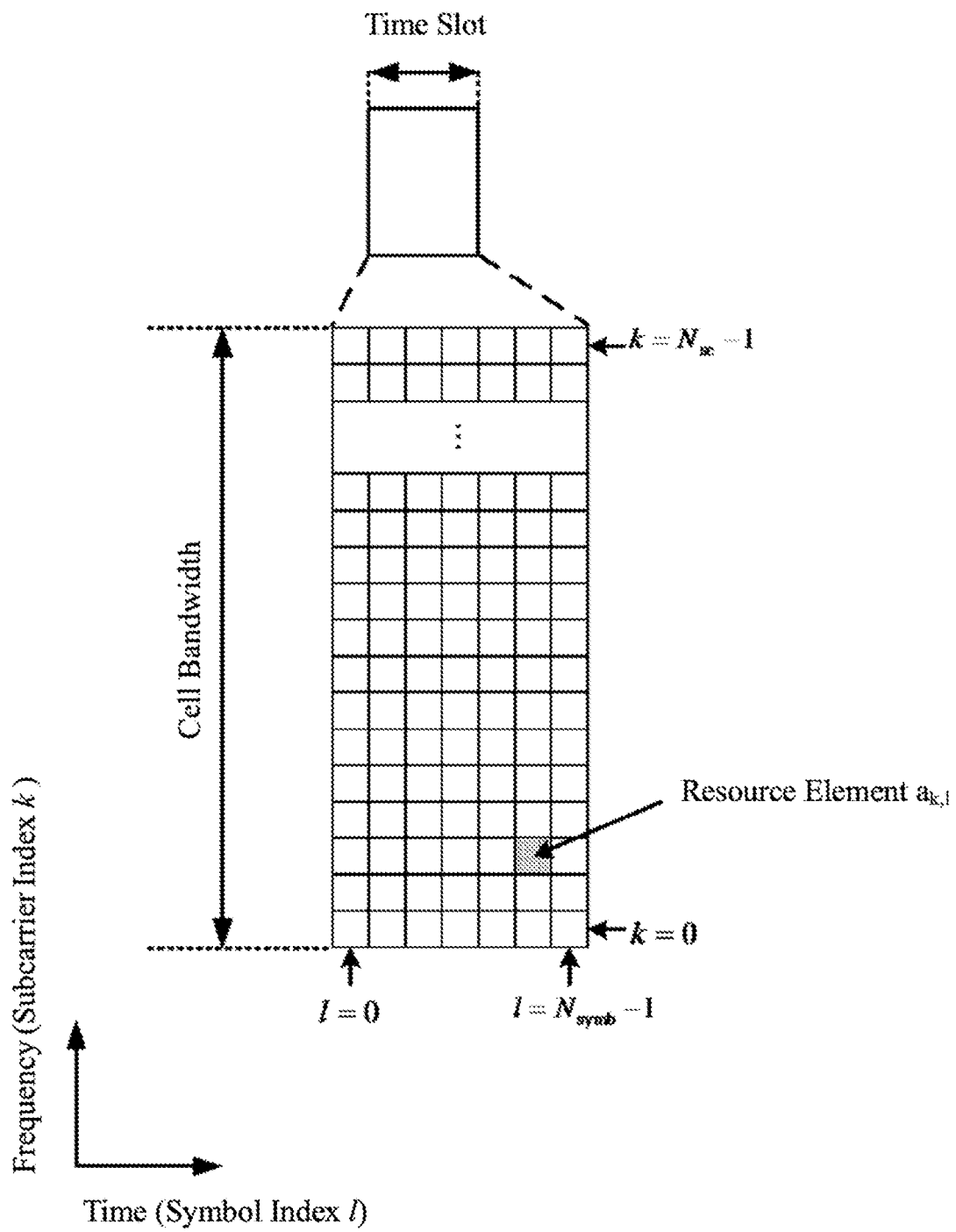
FIG. 3 is a diagram illustrating a schematic configuration of a downlink time slot according to the present embodiment.

Hereinafter, an example of the configuration of a time slot according to the present embodiment will be described. FIG. 3 is a diagram illustrating a schematic configuration of a time slot according to the present embodiment. In FIG. 3, the configuration of a time slot in one cell is shown. In FIG. 3, the horizontal axis is a time axis, and the vertical axis is a frequency axis. The time slot may include $N_{symb}$ OFDM symbols.

In FIG. 3, 1 is the OFDM symbol number/index and k is the subcarrier number/index. The physical signal or the physical channel transmitted in each of the time slots is represented by a resource grid. A resource grid is defined by a plurality of subcarriers and a plurality of OFDM symbols. Each element within a resource grid is referred to as a resource element. The resource element is represented by a subcarrier number/index k and an OFDM symbol number/index 1.

The time slot includes a plurality of OFDM symbols 1 (1=0, 1 . . . , $N_{symb}$) in the time domain. For a normal cyclic prefix (CP), $N_{symb}$ may be 14. For an extended CP, $N_{symb}$ may be 12.

The time slot includes a plurality of subcarriers k (k=0, 1 . . . $N_{RB}$ · $N^{RB}_{SC}$) in the frequency domain. $N_{RB}$ is a bandwidth setting, which is represented by a multiple of $N^{RB}_{SC}$, for a serving cell. $N^{RB}_{SC}$ is the size of a resource block (physical resource block), which is represented by the number of subcarriers, in the frequency domain. The subcarrier spacing Δf may be 15 KHz. The $N^{RB}_{SC}$ may be 12. The size of a resource block (physical resource block) in the frequency domain may be 180 KHz.

One physical resource block is defined by $N_{symb}$ OFDM symbols that are consecutive in the time domain and $N^{RB}_{SC}$ subcarriers that are consecutive in the frequency domain. Therefore, one physical resource block includes ($N_{symb}$· $N^{RB}_{SC}$) resource elements. One physical resource block may correspond to one time slot in the time domain. The physical resource blocks may be numbered nPRB (0, 1 . . . , $N_{RB}$−1) in the ascending order of frequencies in the frequency domain.

Hereinafter, the configurations of the apparatuses according to the present embodiment will be described.

Figure 4:
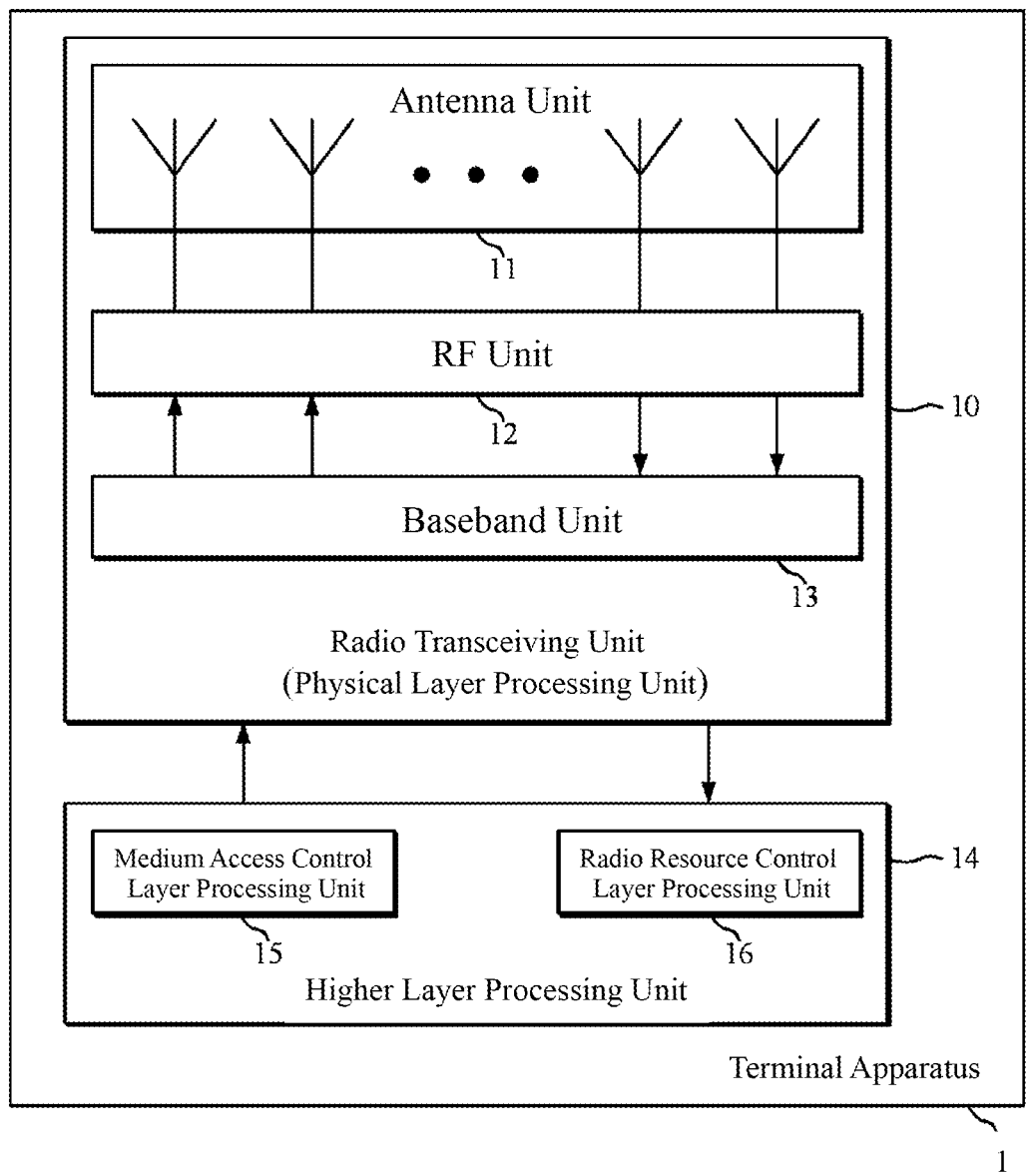
FIG. 4 is a schematic block diagram illustrating a configuration of a terminal apparatus 1 according to the present embodiment.

FIG. 4 is a schematic block diagram illustrating a configuration of a terminal apparatus 1 according to the present embodiment. As shown in FIG. 4, the terminal apparatus 1 includes a radio transceiving unit 10 and a higher layer processing unit 14. The radio transceiving unit 10 includes an antenna unit 11, an RF (Radio Frequency) unit 12, and a baseband unit 13. The higher layer processing unit 14 includes a medium access control layer processing unit 15 and a radio resource control layer processing unit 16. The radio transceiving unit 10 is also referred to as a transmitting unit, a receiving unit, an encoding unit, a decoding unit, or a physical layer processing unit.

The higher layer processing unit 14 outputs uplink data (transport block) generated by a user operation or the like to the radio transceiving unit 10. The higher layer processing unit 14 performs processing of a medium access control (MAC) layer, a packet data convergence protocol (PDCP) layer, a radio link control (RLC) layer, and a radio resource control (RRC) layer.

The medium access control layer processing unit 15 included in the higher layer processing unit 14 performs the processing of the MAC layer. The medium access control layer processing unit 15 controls a random access procedure based on various types of configuration information/parameters managed by the radio resource control layer processing unit 16.

The radio resource control layer processing unit 16 included in the higher layer processing unit 14 performs processing of the RRC layer. The radio resource control layer processing unit 16 manages various types of configuration information/parameters of the terminal apparatus itself. The radio resource control layer processing unit 16 sets various types of configuration information/parameters based on a higher layer signal received from the base station apparatus 3. Namely, the radio resource control layer processing unit 16 sets the various types of configuration information/parameters based on information indicating the various types of configuration information/parameters received from the base station apparatus 3.

The radio transceiving unit 10 performs processing of the physical layer, such as modulation, demodulation, encoding, decoding, and the like. The radio transceiving unit 10 demultiplexes, demodulates, and decodes the signal received from the base station apparatus 3, and then outputs decoded information to the higher layer processing unit 14. The radio transceiving unit 10 generates a transmission signal by modulating and encoding data, and then transmits the transmission signal to the base station apparatus 3.

The RF unit 12 converts (down-converts) a signal received via the antenna unit 11 into a baseband signal by quadrature demodulation, and then removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a cyclic prefix (CP) from the converted digital signal, performs a fast Fourier transform (FFT) on the signal from which the CP has been removed, and extracts a signal in the frequency domain.

The baseband unit 13 generates an SC-FDMA symbol by performing an inverse fast Fourier transform (IFFT) on data, adds a CP to the generated SC-FDMA symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal to a signal with a carrier frequency, and transmits the up-converted signal via the antenna unit 11. Further, the RF unit 12 amplifies power. The RF unit 12 may provide a function of controlling transmission power. The RF unit 12 may also be referred to as a transmission power control unit.

Figure 5:
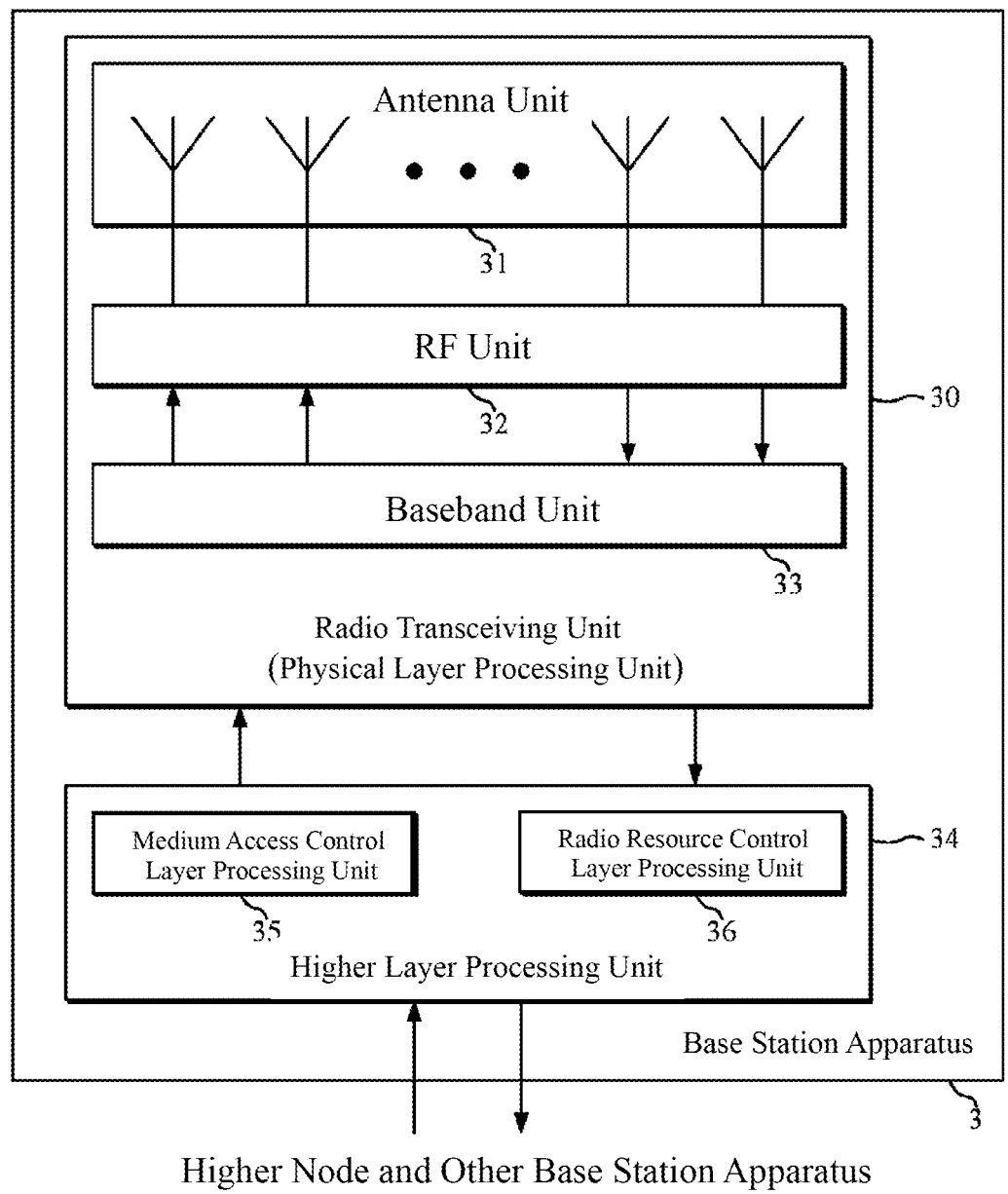
FIG. 5 is a schematic block diagram illustrating a configuration of a base station apparatus 3 according to the present embodiment.

FIG. 5 is a schematic block diagram illustrating a configuration of a base station apparatus 3 according to the present embodiment. As shown in FIG. 5, the base station apparatus 3 includes a radio transceiving unit 30 and a higher layer processing unit 34. The radio transceiving unit 30 includes an antenna unit 31, an RF unit 32, and a baseband unit 33. The higher layer processing unit 34 includes a medium access control layer processing unit 35 and a radio resource control layer processing unit 36. The radio transceiving unit 30 is also referred to as a transmitting unit, a receiving unit, an encoding unit, a decoding unit, or a physical layer processing unit.

The higher layer processing unit 34 performs processing of a medium access control (MAC) layer, a packet data convergence protocol (PDCP) layer, a radio link control (RLC) layer, and a radio resource control (RRC) layer.

The medium access control layer processing unit 35 included in the higher layer processing unit 34 performs the processing of the MAC layer. The medium access control layer processing unit 35 controls a random access procedure based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, or acquires from a higher node, downlink data (transport block) allocated on a physical downlink shared channel, system information, an RRC message, a MAC control element (CE), and the like, and outputs them to the radio transceiving unit 30. In addition, the radio resource control layer processing unit 36 manages various types of configuration information/parameters for each terminal apparatus 1. The radio resource control layer processing unit 36 can set various types of configuration information/parameters for each terminal apparatus 1 via a higher layer signal. That is, the radio resource control layer processing unit 36 transmits/broadcasts information indicating various types of configuration information/parameters.

The functionality of the radio transceiving unit 30 is similar to the functionality of the radio transceiving unit 10, and hence the description thereof is omitted.

Each of the units with reference numerals 10 to 16 included in the terminal apparatus 1 may be configured as a circuit. Each of the units with reference numerals 30 to 36 included in the base station apparatus 3 may be configured as a circuit. Each of the units with reference numerals 10 to 16 included in the terminal apparatus 1 may be configured as at least one processor and a memory connected to the at least one processor. Each of the units with reference numerals 30) to 36 included in the base station apparatus 3 may be configured as at least one processor and a memory connected to the at least one processor.

Hereinafter, a band width part (BWP) will be described.

The BWP is defined by one or more physical resource blocks that are contiguous in the frequency domain.

One or more downlink BWPs and one or more uplink BWPs may be configured for a serving cell.

The one or more downlink BWPs include at least one initial downlink BWP. The one or more uplink BWPs include at least one initial uplink BWP. The index of the initial downlink BWP and the index of the initial uplink BWP are 0). The terminal apparatus 1 may receive a higher layer parameter indicating the initial downlink BWP.

In one serving cell, at most one downlink BWP of one or more downlink BWPs is activated simultaneously. In one serving cell, at most one uplink BWP of one or more uplink BWPs is activated simultaneously. The terminal apparatus 1 may switch an activated downlink BWP and/or an activated uplink BWP based on an RRC parameter and/or a PDCCH. Switching an activated BWP in the uplink and downlink means activating a deactivated BWP and deactivating an activated BWP simultaneously.

The terminal apparatus 1 may monitor a PDCCH and receive a PDSCH (DL-SCH) in an activated downlink BWP. The terminal apparatus 1 may not monitor the PDCCH and receive the PDSCH (DL-SCH) in a deactivated downlink BWP. The monitoring may mean to attempt to decode the PDCCH according to a DCI format.

The terminal apparatus 1 may transmit a PUSCH (UL-SCH), a PUCCH, and an SRS in an activated uplink BWP. The terminal apparatus 1 may not transmit a PUSCH (UL-SCH), a PUCCH, and an SRS in a deactivated uplink BWP.

An activated downlink BWP is also referred to as an active downlink BWP. An activated uplink BWP is also referred to as an active uplink BWP.

Hereinafter, a CORESET (control resource set) will be described. The CORESET according to the present embodiment is included in an activated downlink BWP.

Figure 6:
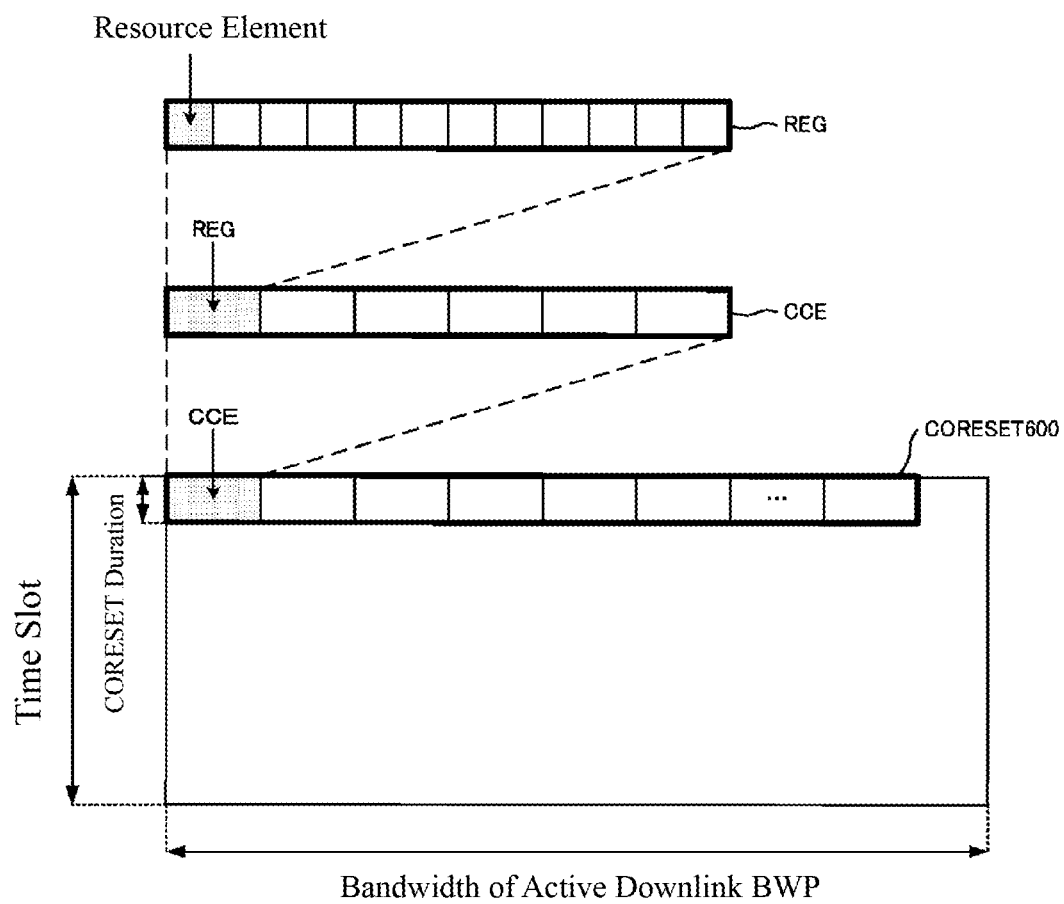
FIG. 6 is a diagram illustrating an example of a CORESET according to the present embodiment.

FIG. 6 is a diagram illustrating an example of a CORESET according to the present embodiment. In the present embodiment, the CORESET is included in one BWP. In the time domain, a duration of CORESET in one PDCCH monitoring occasion is one, two or three OFDM symbols. The PDCCH monitoring occasion is a set of OFDM symbols in which CORESET monitoring is configured. The CORESET may include a plurality of CCEs (Control Channel Elements). The CORESET may include a plurality of resource elements that are contiguous in the frequency domain. A CCE may include 6 contiguous REGs (Resource Element Groups) in the frequency domain. One REG may include 12 resource elements that are contiguous in the frequency domain.

Figure 7:
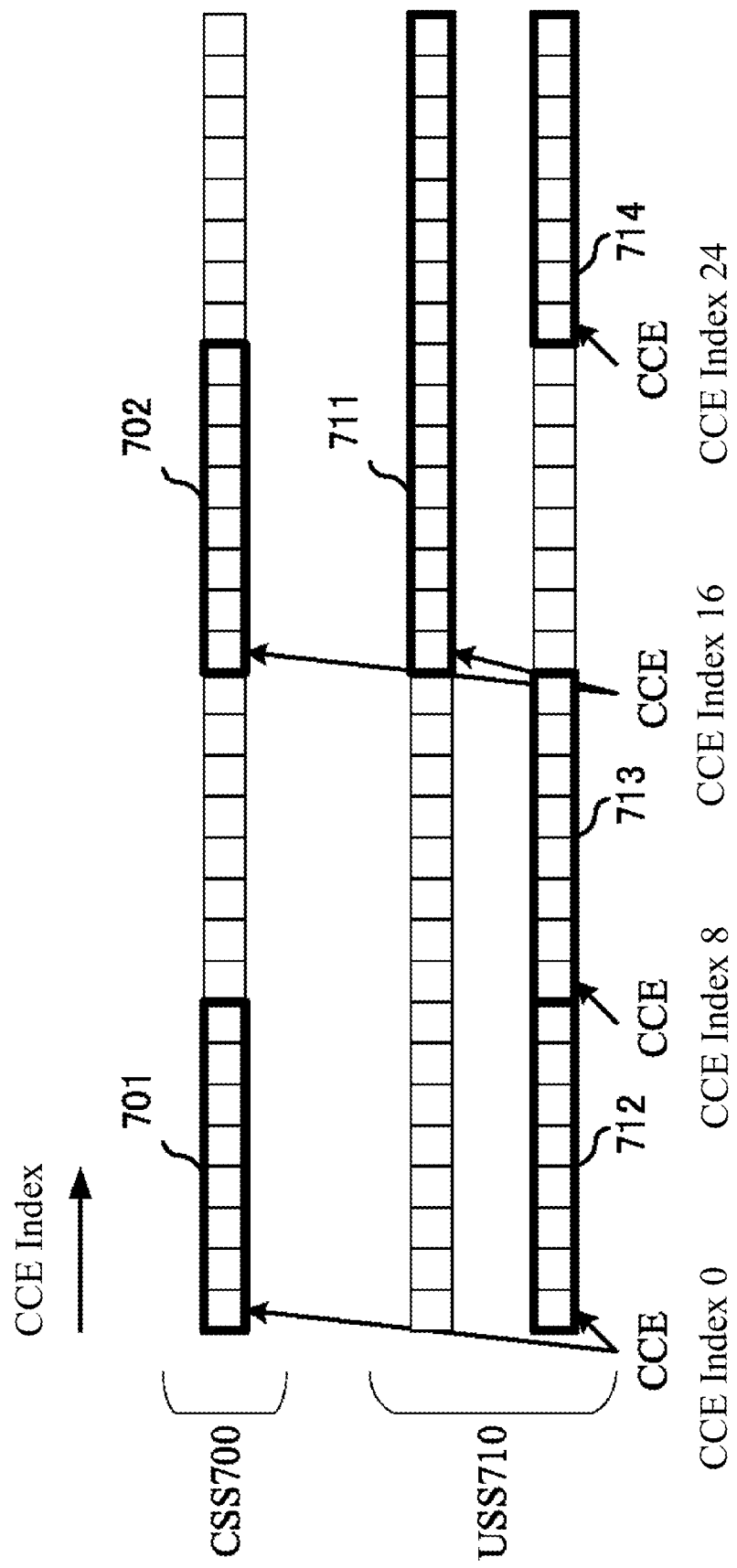
FIG. 7 is a diagram illustrating an example of a search space according to the present embodiment.

FIG. 7 is a diagram illustrating an example of a search space according to the present embodiment. The search space is a set of PDCCH candidates. The PDCCH is transmitted in the PDCCH candidate. The terminal apparatus 1 attempts to decode the PDCCH in the search space. The PDCCH candidate may include one or more CCEs. The number of CCEs that constitute the PDCCH candidate is also referred to as an aggregation level.

The search space 700 is a CSS (Common Search Space). The search space 710 is a USS (UE-Specific Search Space). The CSS 700 and the USS 710 are included in one CORESET. The PDCCH candidates included in the USS 710 may be given at least based on a predetermined RNTI. Here, the predetermined RNTI may be a C-RNTI (Cell Radio Network Temporary Identifier). The PDCCH candidates included in the CSS 700 may be given regardless of the predetermined RNTI.

The CSS 700 includes two PDCCH candidates 701, 702 with each having an aggregation level of 8. The USS 710 includes one PDCCH candidate 711 having an aggregation level of 16, and three PDCCH candidates 712, 713, 714 with each having an aggregation level of 8.

The set of CCEs constituting the PDCCH candidate 701 is the same as the set of CCEs constituting the PDCCH candidate 712. The set of CCEs constituting the PDCCH candidate 702 is different from the set of CCEs constituting the PDCCH candidate 711, but the CCE with the smallest index that constitutes the PDCCH candidate 702 is the same as the CCE with the smallest index that constitutes the PDCCH candidate 711.

Hereinafter, a DCI format of the present embodiment will be described. In the present embodiment, the size of a DCI format is also referred to as a DCI size or the payload size of a DCI format.

DCI format 0_0 of the present embodiment will be described.

The DCI format 0_0 may be used for scheduling of a PUSCH within a single cell.

The DCI format 0_0 of the present embodiment is DCI format 0_0 with CRC scrambled by C-RNTI. The DCI format 0_0 includes at least the following fields.

"Identifier for DCI formats" field—1 bit
"Frequency domain resource assignment" field—$N_{FDRA0\_0}$ bit
"Time domain resource assignment" field—4 bits
"Frequency hopping flag" field—1 bit
"Modulation and coding scheme" field—5 bits
"New data indicator" field—1 bit
"Redundancy version" field—2 bits
"HARQ process number" field—4 bits
"TPC command for scheduled PUSCH" field—2 bits
"UL/SUL indicator" field—0 or 1 bit The size $N_{FDRA0\_0}$ of the "frequency domain resource assignment" field of DCI format 0_0 may be given by the following formula (1). The size of the "UL/SUL indicator" field may be given at least based on a higher layer parameter. Hereinafter, in the present embodiment, the size of the "UL/SUL indicator" field is 0 bit. The size of the fields of DCI format 0_0 other than the size of the "frequency domain resource assignment" field and the size of the "UL/SUL indicator" field is predefined by the specification.

$$N_{FDRA0\_0} = \text{ceil}\left(\log_2(N^{UL,BWP}(N^{UL,BWP}+1)/2)\right) \quad \text{[Formula 1]}$$

$N^{UL,BWP}$ is the size of the active UL BWP in a case that DCI format 0_0 is monitored in the USS and satisfying
(condition A) the total number of different DCI sizes monitored per slot is no more than $X_A$ for the cell, and
(condition B) the total number of different DCI sizes with C-RNTI monitored per slot is no more than $X_B$ for the cell otherwise, $N_{UL,BWP}$ is the size of the initial UL BWP.
$N^{UL,BWP}$ is represented by the number of resource blocks. $N^{UL,BWP}$ is the size of an initial uplink BWP or the size of an active uplink BWP.

$N^{UL,BWP}$ may be the size of the active uplink BWP in a case that DCI format 0_0 is monitored in the USS and that the condition A and the condition B are satisfied. Otherwise, $N^{UL,BWP}$ may be the size of the initial uplink BWP.

$N^{UL,BWP}$ may be the size of the initial uplink BWP in a case that the condition A or the condition B is not satisfied or in a case that DCI format 0_0 is monitored in the CSS. Otherwise, $N^{UL,BWP}$ may be the size of the active uplink BWP.

The condition A may be a condition that the total number of different DCI sizes monitored per slot is no more than $X_A$ (e.g. 4) for the cell. Here, the value of $X_A$ may be 4 or a value greater than 4.

The condition B may be a condition that the total number of different DCI sizes with C-RNTI monitored per slot is no more than $X_B$ (e.g. 3) for the cell. Here, the value of $X_B$ may be 3 or a value greater than 3. The value of $X_B$ may be the same as or smaller than the value of $X_A$.

DCI format 1_0 of the present embodiment will be described.

The DCI format 1_0 may be used for scheduling of a PDSCH within a single cell in a case that the "frequency domain resource assignment" field of the DCI format 1_0 is not set to all "1"s. The "frequency domain resource assignment" field of the DCI format 1_0 of the present embodiment is not set to all "1"s. That is, the DCI format 1_0 of the present embodiment may be used for scheduling of a PDSCH in a single cell. The DCI format 1_0 of the present embodiment is DCI format 0_0 with a CRC scrambled by C-RNTI.

The DCI format 1_0 includes the following fields.
"Identifier for DCI formats" field—1 bit
"Frequency domain resource assignment" field—$N_{FDRA1\_0}$ bit "Time domain resource assignment" field—4 bits
"VRB-to-PRB mapping" field—1 bit
"Modulation and coding scheme" field—5 bits
"New data indicator" field—1 bit
"Redundancy version" field—2 bits
"HARQ process number" field—4 bits
"Downlink assignment index" field—2 bits
"TPC command for scheduled PUCCH field—2 bits
"PUCCH resource indicator" field—3 bits
"PDSCH-to-HARQ feedback timing indicator" field—3 bits The size $N_{FDRA1\_0}$ of the "frequency domain resource assignment" field of DCI format 1_0 may be given by the following formula (2). The size of the fields of DCI format 1_0 other than the size of the "frequency domain resource assignment" field is predefined by the specification.

$$N_{FDR1\_0} = \mathrm{ceil}\ (\log_2(N^{DL,BWT}(N^{DL,BWT}+1)/2))\qquad \text{[Formula 2]}$$

$N^{DL,BWP}$ is the size of the active DL BWP in a case that DCI format 1_0 is monitored in the USS and satisfying
(condition A) the total number of different DCI sizes monitored per slot is no more than $X_A$ for the cell, and
(condition B) the total number of different DCI sizes with C-RNTI monitored per slot is no more than $X_B$ for the cell
otherwise, $N_{DL,BWP}$ is the size of the certain band X.

$N^{DL,BWP}$ is represented by the number of resource blocks. $N^{DL,BWP}$ is the size of an active downlink BWP or the size of a predetermined band X. Here, the predetermined band X may be an initial downlink BWP or a predetermined CORESET. Here, the predetermined CORESET may be a CORESET for monitoring DCI format 1_0 or a CORESET with a predetermined index. The predetermined index may be a predetermined value (e.g., 0). The predetermined index may be given by an RRC parameter. The band of the initial downlink BWP may be different from that of the predetermined CORESET.

$N^{DL,BWP}$ may be the size of the active downlink BWP in a case that DCI format 1_0 is monitored in the USS and the condition A and the condition B are satisfied. Otherwise, $N_{UL,BWP}$ may be the size of the predetermined band X.

$N^{DL,BWP}$ may be the size of the predetermined band X in a case that the condition A or the condition B is not satisfied or in a case that DCI format 0_0 is monitored in the CSS. Otherwise, $N^{DL,BWP}$ may be the size of the active downlink BWP.

The size of the DCI format 0_0 monitored in the CSS for scheduling a serving cell is the same as that of the DCI format 1_0 monitored in the CSS for scheduling the same serving cell.

In a case that the DCI format 0_0 for scheduling a serving cell is monitored in the CSS, and that the number of information bits in the DCI format 0_0 prior to a padding or truncating process is smaller than the size of the DCI format 1_0 monitored in the CSS for scheduling the same serving cell, one or more bits may be appended in the DCI format 0_0 until the size of the DCI format 0_0 is the same as the size of the DCI format 1_0. Here, the one or more bits are set to 0.

In a case that the DCI format 0_0 for scheduling a serving cell is monitored in the CSS, and that the number of information bits in the DCI format 0_0 prior to a padding or truncating process is greater than the size of the DCI format 1_0 monitored in the CSS for scheduling the same serving cell, the bit width of the "frequency domain resource assignment" field may be reduced by truncating the first one or more MSBs (Most Significant Bits) of the "frequency domain resource assignment" field, so as to make the size of the DCI format 0_0 the same as the size of the DCI format 1_0.

The size of the DCI format 0_0 monitored in the USS for scheduling a serving cell is the same as that of the DCI format 1_0 monitored in the USS for scheduling the same serving cell.

In a case that the DCI format 0_0 for scheduling a serving cell is monitored in the USS with at least one of the condition A and the condition B is not satisfied, and that the number of information bits in the DCI format 0_0 prior to a padding or truncating process is smaller than the size of the DCI format 1_0 monitored in the USS for scheduling the same serving cell, one or more bits may be appended in the DCI format 0_0 until the size of the DCI format 0_0 is the same as the size of the DCI format 1_0. Here, the one or more bits are set to 0.

In a case that the DCI format 0_0 for scheduling a serving cell is monitored in the USS with at least one of the condition A and the condition B is not satisfied, and that the number of information bits in the DCI format 0_0 prior to a padding or truncating process is greater than the size of the DCI format 1_0 monitored in the USS for scheduling the same serving cell, the bit width of the "frequency domain resource assignment" field may be reduced by truncating the first one or more MSBs (Most Significant Bits) of the "frequency domain resource assignment" field, so as to make the size of the DCI format 0_0 the same as the size of the DCI format 1_0.

In a case that the DCI format 0_0 for scheduling a serving cell is monitored in the USS with both of the condition A and the condition B are satisfied, and that the number of information bits in the DCI format 0_0 prior to a padding or truncating process is smaller than the size of the DCI format 1_0 monitored in the USS for scheduling the same serving cell, one or more bits may be appended in the DCI format 0_0 until the size of the DCI format 0_0 is the same as the size of the DCI format 1_0. Here, the one or more bits are set to 0.

In a case that the DCI format 0_0 for scheduling a serving cell is monitored in the USS with both of the condition A and the condition B are satisfied, and that the number of information bits in the DCI format 0_0 prior to a padding or truncating process is greater than the size of the DCI format 1_0 monitored in the USS for scheduling the same serving cell, the size of the DCI format 0_0 is the same as the number of information bits in the DCI format 0_0 prior to a padding or truncating process.

In a case that the DCI format 1_0 for scheduling a serving cell is monitored in the USS with both of the condition A and the condition B are satisfied, and that the number of information bits in the DCI format 1_0 prior to a padding process is smaller than the size of the DCI format 0_0 monitored in the USS for scheduling the same serving cell, one or more bits may be appended in the DCI format 1_0 until the size of the DCI format 1_0 is the same as the size of the DCI format 0_0. Here, the one or more bits are set to 0.

The terminal apparatus 1 may identify the DCI format 0_0 and the DCI format 1_0 through the "Identifier for DCI formats" field. The "Identifier for DCI formats" field of the DCI format 0_0 is set to 0. The "Identifier for DCI formats" field of the DCI format 1_0 is set to 1.

DCI format 0_1 of the present embodiment will be described.

The DCI format 0_1 may be used for scheduling of a PUSCH within a single cell. Unless otherwise specified, the DCI format 0_1 of the present embodiment is DCI format 0_1 with CRC scrambled by C-RNTI. The set of fields included in the DCI format 0_1 is different from the set of fields included in DCI format 0_0.

DCI format 1_1 of the present embodiment will be described.

The DCI format 1_1 may be used for scheduling of a PDSCH within a single cell. Unless otherwise specified, the DCI format 1_1 of the present embodiment is DCI format 1_1 with CRC scrambled by C-RNTI. The set of fields included in the DCI format 1_1 is different from the set of fields included in DCI format 1_0.

The DCI format 0_1 and DCI format 1_1 are monitored only in the USS of the CSS and USS. The DCI format 0_1 and DCI format 1_1 are not monitored in the CSS.

The size of the DCI format 0_1 for scheduling a serving cell is different from any one of the following: the size of the DCI format 0_0 monitored in the CSS for scheduling the same serving cell, the size of the DCI format 1_0 monitored in the CSS for scheduling the same serving cell, the size of the DCI format 0_0 monitored in the USS for scheduling the same serving cell, and the size of the DCI format 1_0 monitored in the USS for scheduling the same serving cell.

In a case where the number of information bits of the DCI format 0_1 prior to a padding process for scheduling a serving cell is the same as any one of the size of the DCI format 0_0 monitored in the CSS for scheduling the same serving cell, the size of the DCI format 1_0 monitored in the CSS for scheduling the same serving cell, the size of DCI format 0_0 monitored in the USS for scheduling the same serving cell, and the size of DCI format 1_0 monitored in the USS for scheduling the same serving cell, one or more bits may be appended to the DCI format 0_1 until the size of the DCI format 0_1 is different from any one of the following: the size of the DCI format 0_0 monitored in the CSS for scheduling the same serving cell, the size of the DCI format 1_0 monitored in the CSS for scheduling the same serving cell, the size of DCI format 0_0 monitored in the USS for scheduling the same serving cell, and the size of DCI format 1_0 monitored in the USS for scheduling the same serving cell. Here, the one or more bits are set to 0.

In a case where the number of information bits of the DCI format 0_1 prior to a padding process for scheduling a serving cell is the same as any one of the size of the DCI format 0_0 monitored in the CSS for scheduling the same serving cell and the size of the DCI format 0_0 monitored in the USS for scheduling the same serving cell, one or more bits may be appended to the DCI format 0_1 until the size of the DCI format 0_1 is different from any one of the size of the DCI format 0_0 monitored in the CSS for scheduling the same serving cell and the size of the DCI format 0_0 monitored in the USS for scheduling the same serving cell. Here, the one or more bits are set to 0.

In a case where the number of information bits of the DCI format 0_1 prior to a padding process for scheduling a serving cell is the same as any one of the size of the DCI format 1_0 monitored in the CSS for scheduling the same serving cell and the size of the DCI format 1_0 monitored in the USS for scheduling the same serving cell, one or more bits may be appended to the DCI format 0_1 until the size of the DCI format 0_1 is different from any one of the size of the DCI format 1_0 monitored in the CSS for scheduling the same serving cell and the size of the DCI format 1_0 monitored in the USS for scheduling the same serving cell. Here, the one or more bits are set to 0.

In a case where the number of information bits of the DCI format 0_1 prior to a padding process for scheduling a serving cell is the same as any one of the size of the DCI format 0_0 derived according to the size of an initial uplink BWP for scheduling the same serving cell, the size of the DCI format 1_0 derived according to a predetermined band X for scheduling the same serving cell, the size of DCI format 0_0 derived according to the size of an active uplink BWP for scheduling the same serving cell, and the size of DCI format 1_0 derived according to the size of an active downlink BWP for scheduling the same serving cell, one or more bits may be appended to the DCI format 0_1 until the size of the DCI format 0_1 is different from any one of the following: the size of the DCI format 0_0 derived according to the size of the initial uplink BWP for scheduling the same serving cell, the size of the DCI format 1_0) derived according to the predetermined band X for scheduling the same serving cell, the size of DCI format 0_0 derived according to the size of the active uplink BWP for scheduling the same serving cell, and the size of DCI format 1_0 derived according to the size of the active downlink BWP for scheduling the same serving cell. Here, the one or more bits are set to 0.

In a case where the number of information bits of the DCI format 0_1 prior to a padding process for scheduling a serving cell is the same as any one of the size of the DCI format 0_0 derived according to an initial uplink BWP for scheduling the same serving cell and the size of the DCI format 0_0 derived according to the size of an active uplink BWP for scheduling the same serving cell, one or more bits may be appended to the DCI format 0_1 until the size of the DCI format 0_1 is different from any one of the size of the DCI format 0_0) derived according to the initial uplink BWP for scheduling the same serving cell and the size of the DCI format 0_0 derived according to the size of the active uplink BWP for scheduling the same serving cell. Here, the one or more bits are set to 0).

In a case where the number of information bits of the DCI format 0_1 prior to a padding process for scheduling a serving cell is the same as any one of the size of the DCI format 1_0 derived according to a predetermined band X for scheduling the same serving cell and the size of the DCI format 1_0 derived according to the size of an active downlink BWP for scheduling the same serving cell, one or more bits may be appended to the DCI format 0_1 until the size of the DCI format 0_1 is different from any one of the size of the DCI format 1_0) derived according to the predetermined band X for scheduling the same serving cell and the size of the DCI format 1_0 derived according to the size of the active downlink BWP for scheduling the same serving cell. Here, the one or more bits are set to 0.

In a case where the number of information bits of the DCI format 0_1 prior to a padding process for scheduling a serving cell is the same as any one of the size of the DCI format 1_0 derived according to the size of an initial downlink BWP for scheduling the same serving cell, the size of the DCI format 1_0 derived according to the above-mentioned predetermined CORESET for scheduling the same serving cell, and the size of DCI format 1_0) derived according to the size of an active downlink BWP for scheduling the same serving cell, one or more bits may be appended to the DCI format 0_1 until the size of the DCI format 1_1 is different from any one of the following: the size of the DCI format 1_0 derived according to the size of the initial downlink BWP for scheduling the same serving cell, the size of the DCI format 1_0) derived according to the above-mentioned predetermined CORESET for scheduling the same serving cell, and the size of DCI format 1_0 derived according to the size of the active downlink BWP for scheduling the same serving cell. Here, the one or more bits are set to 0.

The size of the DCI format 1_1 for scheduling a serving cell is different from any one of the following: the size of the DCI format 0_0 monitored in the CSS for scheduling the same serving cell, the size of the DCI format 1_0 monitored in the CSS for scheduling the same serving cell, the size of the DCI format 0_0 monitored in the USS for scheduling the same serving cell, and the size of the DCI format 1_0 monitored in the USS for scheduling the same serving cell.

In a case where the number of information bits of the DCI format 1_1 prior to a padding process for scheduling a serving cell is the same as any one of the size of the DCI format 0_0 monitored in the CSS for scheduling the same serving cell, the size of the DCI format 1_0) monitored in the CSS for scheduling the same serving cell, the size of DCI format 0_0) monitored in the USS for scheduling the same serving cell, and the size of DCI format 1_0) monitored in the USS for scheduling the same serving cell, one or more bits may be appended to the DCI format 1_1 until the size of the DCI format 1_1 is different from any one of the following: the size of the DCI format 0_0 monitored in the CSS for scheduling the same serving cell, the size of the DCI format 1_0 monitored in the CSS for scheduling the same serving cell, the size of DCI format 0_0 monitored in the USS for scheduling the same serving cell, and the size of DCI format 1_0 monitored in the USS for scheduling the same serving cell. Here, the one or more bits are set to 0).

In a case where the number of information bits of the DCI format 1_1 prior to a padding process for scheduling a serving cell is the same as any one of the size of the DCI format 0_0 monitored in the CSS for scheduling the same serving cell and the size of the DCI format 0_0 monitored in the USS for scheduling the same serving cell, one or more bits may be appended to the DCI format 1_1 until the size of the DCI format 1_1 is different from any one of the size of the DCI format 0_0 monitored in the CSS for scheduling the same serving cell and the 20) size of the DCI format 0_0 monitored in the USS for scheduling the same serving cell. Here, the one or more bits are set to 0).

In a case where the number of information bits of the DCI format 1_1 prior to a padding process for scheduling a serving cell is the same as any one of the size of the DCI format 1_0 monitored in the CSS for scheduling the same serving cell and the size of the DCI format 1_0) monitored in the USS for scheduling the same serving cell, one or more bits may be appended to the DCI format 1_1 until the size of the DCI format 1_1 is different from any one of the size of the DCI format 1_0 monitored in the CSS for scheduling the same serving cell and the size of the DCI format 1_0 monitored in the USS for scheduling the same serving cell. Here, the one or more bits are set to 0.

In a case where the number of information bits of the DCI format 1_1 prior to a padding process for scheduling a serving cell is the same as any one of the size of the DCI format 0_0 derived according to the size of an initial uplink BWP for scheduling the same serving cell, the size of the DCI format 1_0 derived according to a predetermined band X for scheduling the same serving cell, the size of DCI format 0_0 derived according to the size of an active uplink BWP for scheduling the same serving cell, and the size of DCI format 1_0 derived according to the size of an active downlink BWP for scheduling the same serving cell, one or more bits may be appended to the DCI format 1_1 until the size of the DCI format 1_1 is different from any one of the following: the size of the DCI format 0_0 derived according to the size of the initial uplink BWP for scheduling the same serving cell, the size of the DCI format 1_0) derived according to the predetermined band X for scheduling the same serving cell, the size of DCI format 0_0 derived according to the size of the active uplink BWP for scheduling the same serving cell, and the size of DCI format 1_0 derived according to the size of the active downlink BWP for scheduling the same serving cell. Here, the one or more bits are set to 0.

In a case where the number of information bits of the DCI format 1_1 prior to a padding process for scheduling a serving cell is the same as any one of the size of the DCI format 0_0 derived according to an initial uplink BWP for scheduling the same serving cell and the size of the DCI format 0_0 derived according to the size of an active uplink BWP for scheduling the same serving cell, one or more bits may be appended to the DCI format 1_1 until the size of the DCI format 1_1 is different from any one of the size of the DCI format 0_0 derived according to the initial uplink BWP for scheduling the same serving cell and the size of the DCI format 0_0 derived according to the size of the active uplink BWP for scheduling the same serving cell. Here, the one or more bits are set to 0.

In a case where the number of information bits of the DCI format 1_1 prior to a padding process for scheduling a serving cell is the same as any one of the size of the DCI format 1_0 derived according to a predetermined band X for scheduling the same serving cell and the size of the DCI format 1_0 derived according to the size of an active downlink BWP for scheduling the same serving cell, one or more bits may be appended to the DCI format 1_1 until the size of the DCI format 1_1 is different from any one of the size of the DCI format 1_0 derived according to the predetermined band X for scheduling the same serving cell and the size of the DCI format 1_0 derived according to the size of the active downlink BWP for scheduling the same serving cell. Here, the one or more bits are set to 0.

In a case where the number of information bits of the DCI format 1_1 prior to a padding process for scheduling a serving cell is the same as any one of the size of the DCI format 1_0 derived according to the size of an initial downlink BWP for scheduling the same serving cell, the size of the DCI format 1_0 derived according to the above-mentioned predetermined CORESET for scheduling the same serving cell, and the size of DCI format 1_0 derived according to the size of an active downlink BWP for scheduling the same serving cell, one or more bits may be appended to the DCI format 1_1 until the size of the DCI format 1_1 is different from any one of the following: the size of the DCI format 1_0 derived according to the size of the initial downlink BWP for scheduling the same serving cell, the size of the DCI format 1_0) derived according to the above-mentioned predetermined CORESET for scheduling the same serving cell, and the size of DCI format 1_0 derived according to the size of the active downlink BWP for scheduling the same serving cell. Here, the one or more bits are set to 0.

The size of the DCI format 0_1 for scheduling a serving cell may be the same or different from the size of the DCI format 1_1 for scheduling the same serving cell.

In a case that the size of the DCI format 0_1 for scheduling a serving cell is the same as the size of the DCI format 1_1 for scheduling the same serving cell, the terminal apparatus 1 may identify the DCI format 0_1 and the DCI format 1_1 by through the "Identifier for DCI formats" field.

The "Identifier for DCI formats" field of the DCI format 0_1 is set to 0. The "Identifier for DCI formats" field of the DCI format 1_0 is set to 1.

FIG. 8 is a diagram illustrating the correspondence between a frequency domain resource assignment field and $N^{DL,BWP}$, $N^{UL,BWP}$ according to the present embodiment. For example, when a predetermined size X is 6, the number of bits of the "frequency domain resource assignment" field derived from the predetermined size X is 5.

FIG. 9 is a diagram illustrating an example of DCI format 0_0 and DCI format 1_0 according to the present embodiment. The numeral 900 denotes a DCI format 1_0 derived from the size of a predetermined band X. The numeral 901 denotes a DCI format 1_0 derived from the size of an active downlink BWP. The numeral 902 denotes a DCI format 0_0 derived from the 20) size of an initial uplink BWP. The numeral 903 denotes a DCI format 0_0 derived from the size of an active uplink BWP.

The size of the "frequency domain resource assignment" field of the DCI format 1_0 900, the size of the "frequency domain resource assignment" field of the DCI format 1_0 901, and the size of the "frequency domain resource assignment" field of the DCI format 0_0 903 are all 13 bits. The size of the "frequency domain resource assignment" field of the DCI format 0_0 902 is 11 bits.

The DCI format 900 is the same as the DCI format 901, and the set of fields of the DCI format 900 is the same as the set of fields of the DCI format 901. The DCI format 902 is the same as the DCI format 903, and the set of fields of the DCI format 902 is different from the set of fields of the DCI format 903. The case that a first set of fields is the same as a second set of fields means that the type and size of the nth field included in the first set of fields is the same as the type and size of the nth field included in the second set of fields (n=1, 2, 3 . . . ).

Even if the size of an initial uplink BWP is different from the size of an active uplink BWP, the number of bits of the "frequency domain resource assignment" field derived from the size of the initial uplink BWP may be the same as the number of bits of the "frequency domain resource assignment" field derived from the size of the active uplink BWP. That is, even in a case that the size of the initial uplink BWP and the size of the active uplink BWP are different, the set of fields of DCI format 0_0 derived from the size of the initial uplink BWP may be the same as the set of fields of DCI format 0_0 derived from the size of the active uplink BWP.

For example, in a case that the size of an initial uplink BWP is 96 while the size of an active uplink BWP is 127, the number of bits of the "frequency domain resource assignment" field derived from the size of the initial uplink BWP may be the same as the number of bits of the "frequency domain resource assignment" field derived from the size of the active uplink BWP.

Even if the size of a predetermined band X is different from the size of an active downlink BWP, the number of bits of the "frequency domain resource assignment" field derived from the size of the predetermined band X may be the same as the number of bits of the "frequency domain resource assignment" field derived from the size of the active downlink BWP. That is, even in a case that the size of the predetermined band X and the size of the active downlink BWP are different, the set of fields of DCI format 1_0 derived from the size of the predetermined band X may be the same as the set of fields of DCI format 1_0 derived from the size of the active downlink BWP.

For example, in a case that the size of a predetermined band X is 96 while the size of an active downlink BWP is 127, the number of bits of the "frequency domain resource assignment" field derived from the size of the predetermined band X may be the same as the number of bits of the "frequency domain resource assignment" field derived from the size of the active downlink BWP.

DCI format 2_0 is used for notifying a slot format. The size of the DCI format 2_0 is configured by a higher layer parameter. The DCI format 2_0 of the present embodiment is DCI format 2_0) with CRC scrambled by SFI-RNTI.

The size of DCI format 2_0 may be the same as or different from the size of other DCI format. When the size of the DCI format 2_0 is the same as that of other DCI format, the terminal apparatus 1 may identify the DCI format 2_0 through the SFI-RNTI.

The DCI format 2_1 is used for notifying the physical resource block(s) and OFDM symbol(s) where the terminal apparatus 1 may assume no transmission is intended for the terminal apparatus 1. The size of the DCI format 2_1 is configured by a higher layer parameter. The DCI format 2_1 of the present embodiment is DCI format 2_1 with the CRC scrambled by the INT-RNTI.

The size of DCI format 2_1 may be the same as or different from the size of other DCI format. When the size of the DCI format 2_1 is the same as that of other DCI format, the terminal apparatus 1 may identify the DCI format 2_1 through the INT-RNTI.

The "frequency domain resource assignment" field of the DCI format 0_0 includes RIV (Resource Indication Value). The RIV included in the "frequency domain resource assignment" field of the DCI format 0_0 is also referred to as RIV 0_0.

The calculation for the RIV 0_0 in the base station apparatus 3 is performed based on the type of the search space (CSS or USS) in which the DCI format 0_0 is transmitted. The interpretation for the RIV 0_0 in the terminal apparatus 1 is performed based on the type of the search space (CSS or USS) in which the DCI format 0_0 is transmitted.

The RIV 0_0 may indicate resource block allocation information. The resource block allocation information of the RIV 0_0 indicates a set of continuously allocated VRBs (Virtual Resource Blocks) within an active uplink BWP to the scheduled terminal apparatus 1. A VRB within the active uplink BWP is mapped to a physical resource block within the same active uplink BWP.

The RIV 0_0 may be given based on at least $RB_{UL\_start}$ and $L_{UL\_RBs}$. $RB_{UL\_start}$ is a starting resource block of the set of continuously allocated VRBs. $L_{UL\_RBs}$ is the length (the number of resource blocks) of the set of continuously allocated VRBs. Here, indexing of the resource blocks is determined within the active uplink BWP. That is, the indexing (numbering) of the resource blocks associated with the RIV 0_0, $RB_{UL\_start}$, and $L_{UL\_RBs}$ starts from the lowest resource block within the active uplink BWP. Here, the lowest resource block may be a resource block with the lowest frequency. The lowest resource block may be the resource block with the smallest index of common resource blocks.

FIG. 10 is a diagram illustrating a pseudo code for calculating RIV 0_0 according to the present embodiment. The RIV 0_0 may be given by using $N_{UL\_BWP}^{size}$ based on the pseudo-code of FIG. 10 except for a case where the size of the DCI format 0_0 in the USS is derived from the size of an initial uplink BWP, and where the DCI format 0_0 is applied to an active uplink BWP different from the initial uplink BWP.

The terminal apparatus 1 may acquire $RB_{UL\_start}$ and $L_{UL\_RBs}$ based on the RIV 0_0 and $N_{UL\_BWP}^{size}$ except for the case where the size of the DCI format 0_0 in the USS is derived from the size of an initial uplink BWP, and where the DCI format 0_0 is applied to an active uplink BWP different from the initial uplink BWP.

$N_{UL\_BWP}^{size}$ is the size of the active uplink BWP except for a case where the DCI format 0_0 is decoded in the CSS. $N_{UL\_BWP}^{size}$ is the size of the active uplink BWP in a case where the DCI format 0_0 is decoded in the USS. $N_{UL\_BWP}^{size}$ is the size of the initial uplink BWP in a case where the DCI format 0_0 is decoded in the CSS.

FIG. 11 is a diagram illustrating a pseudo code for calculating RIV 0_0 according to the present embodiment. The RIV 0_0 may be given by using $N_{UL\_BWP}^{initial}$ and $N_{UL\_BWP}^{active}$ based on the pseudo-code of FIG. 11 in a case where the size of the DCI format 0_0 in the USS is derived from the size of an initial uplink BWP, and where the DCI format 0_0 is applied to an active uplink BWP different from the initial uplink BWP.

The terminal apparatus 1 may acquire $RB_{UL\_start}$ and $L_{UL\_RBs}$ based on the RIV 0_0, initial $N_{UL\_BWP}^{initial}$ and $N_{UL\_BWP}^{active}$ in the case where the size of the DCI format 0_0 in the USS is derived from the size of an initial uplink BWP, and where the DCI format 0_0 is applied to an active uplink BWP different from the initial uplink BWP.

$N_{UL\_BWP}^{initial}$ is the size of the initial uplink BWP. $N_{UL\_BWP}^{active}$ is the size of the active uplink BWP.

The "frequency domain resource assignment" field of the DCI format 1_0 includes RIV (Resource Indication Value). The RIV included in the "frequency domain resource assignment" field of the DCI format 1_0 is also referred to as RIV 1_0.

The calculation for the RIV 1_0 in the base station apparatus 3 is performed based on the type of the search space (CSS or USS) in which the DCI format 1_0 is transmitted. The interpretation for the RIV 1_0 in the terminal apparatus 1 is performed based on the type of the search space (CSS or USS) in which the DCI format 1_0 is transmitted.

The RIV 1_0 may indicate resource block allocation information. The resource block allocation information of the RIV 1_0 indicates a set of continuously allocated VRBs (Virtual Resource Blocks) within an active downlink BWP to the scheduled terminal apparatus 1. A VRB within the active downlink BWP is mapped to a physical resource block within the same active downlink BWP.

The RIV 1_0 may be given based on at least $RB_{DL\_start}$ and $L_{DL\_RBs}$. $RB_{DL\_start}$ is a starting resource block of the set of continuously allocated VRBs. $L_{DL\_RBs}$ is the length (the number of resource blocks) of the set of continuously allocated VRBs. Here, for a PDSCH scheduled by using the DCI format 1_0 in the CSS, indexing (numbering) of the resource blocks may start from the lowest resource block of a CORESET that receives the DCI format 1_0, regardless of which downlink BWP is the active downlink BWP. Here, the lowest resource block may be a resource block with the lowest frequency. The lowest resource block may be the resource block with the smallest index of common resource blocks. Here, for a PDSCH scheduled by using a DCI format other than the DCI format 1_0 in the CSS, the indexing of the resource blocks may be determined within the active downlink BWP. That is, the indexing (numbering) of the resource blocks associated with the RIV 1_0, $RB_{DL\_start}$, and $L_{DL\_RBs}$ may start from the lowest resource block within the active downlink BWP. A DCI format other than the DCI format 1_0 in the CSS may be DCI format 1_0 in the USS.

Alternatively, for a PDSCH scheduled by using DCI format 1_0 with SI-RNTI, indexing (numbering) of the resource blocks may start from the lowest resource block of a CORESET that receives the DCI format 1_0; and for a PDSCH scheduled by using DCI format 1_0) with C-RNTI, indexing of the resource blocks may be determined within the active downlink BWP. Here, the DCI format 1_0 with SI-RNTI and the DCI format 1_0 with C-RNTI may be transmitted and/or received in the CSS.

FIG. 12 is a diagram illustrating a pseudo code for calculating RIV 1_0 according to the present embodiment. The RIV 1_0 may be given by using $N_{DL\_BWP}^{Size}$ based on the pseudo-code of FIG. 12 except for a case where the size of the DCI format 1_0 in the USS is derived from the size of a predetermined band X, and where the DCI format 1_0 is applied to an active downlink BWP different from the predetermined band X.

The terminal apparatus 1 may acquire $RB_{DL\_start}$ and $L_{DL\_RBs}$ based on the RIV 1_0 and $N_{DL\_BWP}^{size}$ except for the case where the size of the DCI format 1_0 in the USS is derived from the size of a predetermined band X, and where the DCI format 1_0 is applied to an active downlink BWP different from the predetermined band X.

$N_{DL\_BWP}^{size}$ is the size of the active downlink BWP except for a case where the DCI format 1_0 is decoded in the CSS. $N_{DL\_BWP}^{size}$ is the size of the active downlink BWP in a case where the DCI format 1_0 is decoded in the USS. $N_{DL\_BWP}^{size}$ is the size of the predetermined band X in a case where the DCI format 1_0 is decoded in the CSS.

FIG. 13 is a diagram illustrating a pseudo code for calculating RIV 1_0 according to the present embodiment. The RIV 1_0 may be given by using $N_{DL\_BWP}^{initial}$ and $N_{DL\_BWP}^{active}$ based on the pseudo-code of FIG. 13 in a case where the size of the DCI format 1_0 in the USS is derived from the size of a predetermined band X, and where the DCI format 1_0 is applied to an active downlink BWP different from the predetermined band X.

The terminal apparatus 1 may acquire $RB_{UL\_start}$ and $L_{UL\_RBs}$ based on the RIV 1_0. $N_{DL\_BWP}^{initial}$ and $N_{DL\_BWP}^{active}$ in the case where the size of the DCI format 1_0 in the USS is derived from the size of a predetermined band X, and where the DCI format 1_0 is applied to an active downlink BWP different from the predetermined band X.

$N_{DL\_BWP}^{initial}$ is the size of the predetermined frequency band X. $N_{DL\_BWP}^{active}$ is the size of the active downlink BWP.

Hereinafter, the scrambling of PDCCH will be described.

A scrambling sequence $C_{PDCCH}$ (i) for scrambling a PDCCH may be initialized by using $C_{PDCCH\_init}$. $C_{PDCCH\_init}$ may be given at least based on $n_{RNTI}$ and $n_{ID}$. $C_{PDCCH\_init}$ may be given based on the following formula (3).

$$C_{PDCCH\_init} = (N_{RNTI} \cdot 2^{16} + n_{ID}) \bmod 2^{31} \qquad \text{(Formula 3)}$$

In a case where a higher layer parameter PDCCH-DMRS-Scrambling-ID is configured, $n_{ID}$ may be given by the higher layer parameter PDCCH-DMRS-Scrambling-ID for a PDCCH in the USS. Otherwise (i.e., in a case where the higher layer parameter PDCCH-DMRS-Scrambling-ID is not configured, or for a PDCCH in the CSS), $n_{ID}$ may be given by a physical layer cell identity.

The higher layer parameter PDCCH-DMRS-Scrambling-ID may be configured for a CORESET. The higher layer parameter PDCCH-DMRS-Scrambling-ID may be configured for a serving cell. The higher layer parameter PDCCH-DMRS-Scrambling-ID may be configured for the terminal apparatus 1.

In a case where a higher layer parameter PDCCH-DMRS-Scrambling-ID is configured, $N_{RNTI}$ is C-RNTI for a PDCCH in the USS. Otherwise (i.e., in a case where the higher layer parameter PDCCH-DMRS-Scrambling-ID is not configured, or for a PDCCH in the CSS), $N_{RNTI}$ is 0). In the present embodiment, C-RNTI is a value different from 0. Therefore, in the present embodiment, in a case where the higher layer parameter PDCCH-DMRS-Scrambling-ID is configured, a scrambling sequence $C_{PDCCH}$ (i) for a PDCCH in the USS is different from a scrambling sequence $C_{PDCCH}$ (i) for a PDCCH in the CSS. In the present embodiment, in a case where the higher layer parameter PDCCH-DMRS-Scrambling-ID is not configured, a scrambling sequence $C_{PDCCH}$ (i) for a PDCCH in the USS is the same as a scrambling sequence $C_{PDCCH}$ (i) for a PDCCH in the CSS.

Hereinafter, a demodulation reference signal (DMRS) sequence for a PDCCH will be described.

The DMRS sequence for a PDCCH is given by a pseudo-random sequence $C_{DMRS}$ (i). The pseudo-random sequence $C_{DMRS}$ (i) may be initialized by using $C_{DMRS\_init}$. The $C_{DMRS\_init}$ may be given based at least on $N_{ID}$ or the above-mentioned $n_{ID}$.

In a case where a higher layer parameter PDCCH-DMRS-Scrambling-ID is configured, $N_{ID}$ may be given by the higher layer parameter PDCCH-DMRS-Scrambling-ID. Otherwise (i.e., in a case where the higher layer parameter PDCCH-DMRS-Scrambling-ID is not configured), Nm may be given by a physical layer cell identity. That is, in the present embodiment, in a case where the higher layer parameter PDCCH-DMRS-Scrambling-ID is not configured, a scrambling sequence $C_{PDCCH}$ (i) for a PDCCH in the USS is the same as a scrambling sequence $C_{PDCCH}$ (i) for a PDCCH in the CSS regardless of which of $N_{ID}$ and $n_{ID}$ the $C_{DMRS\_init}$ is given.

As described above, the terminal apparatus 1 may switch the processing according to which of the CSS and the USS is used for receiving the PDCCH, but when a condition C is satisfied, there may be a problem that the terminal apparatus 1 may not correctly determine which of the PDCCH candidates of the CSS and the PDCCH candidates of the USS are used for transmitting the PDCCH.

The condition C includes at least some or all of the following conditions C1, C2, C3, and C4.

The condition C1 may be that the terminal apparatus 1 is configured to monitor PDCCH candidates in the CSS and PDCCH candidates in the USS according to the DCI format 0_0/1_0 with C-RNTI in one PDCCH monitoring occasion in one CORESET. The condition C1 may be that the terminal apparatus 1 is configured to monitor PDCCH candidates in the CSS and PDCCH candidates in the USS according to the DCI format 0_0/1_0 with C-RNTI in one CORESET. The condition C1 may be that the terminal apparatus 1 is configured to monitor PDCCH candidates in the CSS and PDCCH candidates in the USS according to the DCI format 0_0/1_0 with C-RNTI.

The condition C2 may be that a set of resource elements constituting a PDCCH candidate in the CSS is the same as a set of resource elements constituting a PDCCH candidates in the USS. In the condition C2, the set of resource elements may be a set of REGs or a set of CCEs. For example, in FIG. 7, the set of resource elements/REGs/CCEs constituting the PDCCH candidate 701 of the CSS 700 is the same as the set of resource elements/REGs/CCEs constituting the PDCCH candidate 712 of the USSD 710.

The condition C3 may be that the higher layer parameter PDCCH-DMRS-Scrambling-ID is not configured for the terminal apparatus 1. The condition C3 may also be that the higher layer parameter PDCCH-DMRS-Scrambling-ID is not configured for a CORESET. The condition C3 may also be that a DMRS corresponding to a PDCCH candidate of the CSS is the same as a DMRS corresponding to a PDCCH candidate of the USS, and a PDCCH scrambling sequence corresponding to a PDCCH candidate of the CSS is the same as a PDCCH scrambling sequence corresponding to a PDCCH candidate of the USS. The condition C3 may be that a PDCCH scrambling sequence corresponding to a PDCCH candidate of the CSS is the same as a PDCCH scrambling sequence corresponding to a PDCCH candidate of the USS.

The condition C4 may be that the size of DCI format 0_0/1_0 corresponding to a PDCCH candidate in the CSS is the same as the size of DCI format 0_0/1_0 corresponding to a PDCCH candidate in the USS. In the condition C4, a set of fields of DCI format 0_0 corresponding to a PDCCH candidate in the CSS may be the same as or different from a set of fields of DCI format 0_0 corresponding to a PDCCH candidate in the USS. In the condition C4, a set of fields of DCI format 1_0 corresponding to a PDCCH candidate in the CSS may be the same as or different from a set of fields of DCI format 1_0 corresponding to a PDCCH candidate in the USS.

In the condition C2, condition C3, and condition C4, the PDCCH candidates in the CSS and the PDCCH candidates in the USS may correspond to the same CORESET. The DCI format 0)_0/1_0) may indicate (1) DCI format 0_0. (2) DCI format 1_0, or (3) DCI format 0_0 and DCI format 1_0.

Therefore, when the condition C is satisfied, the terminal apparatus 1 may perform any one of the following processes D1 to D4 for the PDCCH candidate of the CSS and the PDCCH candidate of the USS under the condition C. That is, the terminal apparatus 1 may determine whether to perform any one of the following processes D1 to D4 based on whether the condition C is satisfied.

(Process D1): The terminal apparatus 1 regards that the PDCCH with the DCI format 0)_0/1_0 is transmitted only in the PDCCH candidates of the CSS among the PDCCH candidates of the CSS and the PDCCH candidates of the USS. Here, the terminal apparatus 1 may not need to monitor the PDCCH with the DCI format 0_0/1_0 in the PDCCH candidates of the USS.

(Process D2): The terminal apparatus 1 regards that the PDCCH with the DCI format 0_0/1_0 is transmitted only in the PDCCH candidates of the USS among the PDCCH candidates of the CSS and the PDCCH candidates of the USS. Here, the terminal apparatus 1 may not need to monitor the PDCCH with the DCI format 0_0/1_0 in the PDCCH candidates of the CSS.

(Process D3): The terminal apparatus 1 regards that the PDCCH with the DCI format 0_0/1_0) is transmitted or received in the PDCCH candidates of the USS rather than in the PDCCH candidates of the CSS when it detects the PDCCH with the DCI format 0_0/1_0 in the PDCCH candidates of the CSS.

(Process D4): The terminal apparatus 1 regards that the PDCCH with the DCI format 0_0/1_0 is transmitted or received in the PDCCH candidates of the CSS rather than in the PDCCH candidates of the USS when it detects the PDCCH with the DCI format 0_0/1_0 in the PDCCH candidates of the USS.

If the condition C is not satisfied, the terminal apparatus 1 regards that the PDCCH with the DCI format 0_0/1_0 may be transmitted in any PDCCH candidate of the PDCCH candidates of the CSS and the PDCCH candidates of the USS. If the condition C is not satisfied, the terminal apparatus 1 may monitor both of the PDCCH candidates of the CSS and the PDCCH candidates of the USS.

Therefore, when the condition C is satisfied, the base station apparatus 3 may perform any one of the following processes E1 to E4 for the PDCCH candidate of the CSS and the PDCCH candidate of the USS under the condition C. That is, the base station apparatus 3 may determine whether to perform any one of the following processes E1 to E4 based on whether the condition C is satisfied.

(Process E1): The base station apparatus 3 transmits the PDCCH with the DCI format 0_0/1_0 only in the PDCCH candidates of the CSS among the PDCCH candidates of the CSS and the PDCCH candidates of the USS.

(Process E2): The base station apparatus 3 transmits the PDCCH with the DCI format 0)_0/1_0 only in the PDCCH candidates of the USS among the PDCCH candidates of the CSS and the PDCCH candidates of the USS.

(Process E3): The base station apparatus 3 regards that the PDCCH with the DCI format 0_0/1_0 is transmitted in the PDCCH candidates of the USS rather than in the PDCCH candidates of the CSS when it transmits the PDCCH with the DCI format 0_0/1_0 in the PDCCH candidates of the CSS.

(Process E4): The base station apparatus 3 regards that the PDCCH with the DCI format 0_0/1_0 is transmitted in the PDCCH candidates of the CSS rather than in the PDCCH candidates of the USS when it transmits the PDCCH with the DCI format 0_0/1_0 in the PDCCH candidates of the USS.

If the condition C is not satisfied, the base station apparatus 3 may transmit the PDCCH with the DCI format 0_0/1_0 in any one of the PDCCH candidates of the CSS and the PDCCH candidates of the USS.

Accordingly, when the condition C is satisfied, the terminal apparatus 1 may correctly determine which of the PDCCH candidate of the CSS and the PDCCH candidate of the USS under the condition C has transmitted the PDCCH.

SI-RNTI (System Information-Radio Network Temporary Identifier) is used to broadcast SI (System Information). That is, the SI-RNTI is used to schedule a SIB (System Information Block). The terminal apparatus 1 may monitor DCI format 1_0 with SI-RNTI, which is used for scheduling SIB1, in type-0 CSS. The terminal apparatus 1 may monitor DCI format 1_0 with SI-RNTI, which is used for scheduling SIBs other than SIB1, in type-0a CSS.

RA-RNTI (Random Access-Radio Network Temporary Identifier) is used for a random access response. The terminal apparatus 1 may monitor DCI format 1_0 with RA-RNTI in type-1 CSS.

The first type of CSS may include at least a type-0 CSS, a type-0a CSS, and/or a type-1 CSS. The second type of CSS may include at least a type-0 CSS, a type-0a CSS, and/or a type-1 CSS. Each of the type-0 CSS, the type-0a CSS, and the type-1 CSS belongs to either the first type of CSS or the second type of CSS. For example, the first type of CSS may include a type-0 CSS, and the second type of CSS may include a type-0a CSS and a type-1 CSS.

For the DCI format 1_0 corresponding to the PDCCH candidate of the first type of CSS, a predetermined band X may be the predetermined CORESET described above. That is, the number of bits of the "frequency domain resource assignment" field of the DCI format 1_0) corresponding to the PDCCH candidate of the first type of CSS may be derived from the predetermined CORESET described above. Here, the $N_{DL\_BWP}^{size}$ may be set as the above-mentioned COREST for calculating the RIV configured in the "frequency domain resource assignment" field of the DCI format 1_0 corresponding to the PDCCH candidate of the first type of CSS. That is, the RIV configured in the "frequency domain resource assignment" field of the DCI format 1_0 corresponding to the PDCCH candidate of the first type of CSS may be derived from the predetermined CORESET described above.

For the DCI format 1_0 corresponding to the PDCCH candidate of the second type of CSS, a predetermined band X may be an initial downlink BWP. That is, the number of bits of the "frequency domain resource assignment" field of the DCI format 1_0 corresponding to the PDCCH candidate of the second type of CSS may be derived from an initial downlink BWP. Here, the $N_{DL\_BWP}^{size}$ may be set as an initial downlink BWP for calculating the RIV configured in the "frequency domain resource assignment" field of the DCI format 1_0 corresponding to the PDCCH candidate of the second type of CSS. That is, the RIV configured in the "frequency domain resource assignment" field of the DCI format 1_0 corresponding to the PDCCH candidate of the second type of CSS may be derived from an initial downlink BWP.

As described above, the terminal apparatus 1 may switch the processing according to which type of CSS is used for receiving the PDCCH, but when a condition F is satisfied, there may be a problem that the terminal apparatus 1 may not correctly determine which type of PDCCH candidate is used for transmitting the PDCCH.

The condition F includes at least some or all of the following conditions F1, F2, F3, and F4.

The condition F1 may be that the terminal apparatus 1 is configured to monitor PDCCH candidates in the first type of CSS and PDCCH candidates in the second type of CSS according to the DCI format 1_0 with C-RNTI in one PDCCH monitoring occasion in one CORESET. The condition F1 may be that the terminal apparatus 1 is configured to monitor PDCCH candidates in the first type of CSS and PDCCH candidates in the second type according to the DCI format 1_0 with C-RNTI in one CORESET. The condition F1 may be that the terminal apparatus 1 is configured to monitor PDCCH candidates in the first type of CSS and PDCCH candidates in the second type according to the DCI format 1_0 with C-RNTI. The C-RNTI in the condition F1 may be an RNTI other than the C-RNTI (e.g., SI-RNTI or RA-RNTI).

The condition F2 may be that a set of resource elements constituting a PDCCH candidate in the first type of CSS is the same as a set of resource elements constituting a PDCCH candidates in the second type. In the condition F2, the set of resource elements may be a set of REGs or a set of CCEs.

The condition F3 may be that the size of DCI format 1_0 corresponding to a PDCCH candidate in the first type of CSS is the same as the size of DCI format 1_0 corresponding to a PDCCH candidate in the second type. In the condition F3, a set of fields of DCI format 1_0) corresponding to a PDCCH candidate in the first type of CSS may be the same as or different from a set of fields of DCI format 1_0 corresponding to a PDCCH candidate in the second type of CSS.

In the condition F2 and condition F3, the PDCCH candidates in the first type of CSS and the PDCCH candidates in the second type of CSS may correspond to the same CORESET.

In the condition F, it does not matter whether the higher layer parameter PDCCH-DMRS-Scrambling-ID may be configured. That is, in the condition F, it does not matter whether the higher layer parameter PDCCH-DMRS-Scrambling-ID may be configured for a CORESET. That is, when it is determined whether the condition F is satisfied, the terminal apparatus 1 does not determine whether the higher layer parameter PDCCH-DMRS-Scrambling-ID is configured.

Therefore, when the condition F is satisfied, the terminal apparatus 1 may perform any one of the following processes G1 to G4 for the PDCCH candidate of the first type of CSS and the PDCCH candidate of the second type of CSS under the condition F. That is, the terminal apparatus 1 may determine whether to perform any one of the following processes G1 to G4 based on whether the condition F is satisfied.

(Process G1): The terminal apparatus 1 regards that the PDCCH with the DCI format 1_0) is transmitted only in the PDCCH candidates of the first type of CSS among the PDCCH candidates of the first type of CSS and the PDCCH candidates of the second type of CSS. Here, the terminal apparatus 1 may not need to monitor the PDCCH with the DCI format 1_0 in the PDCCH candidates of the second type of CSS.

(Process G2): The terminal apparatus 1 regards that the PDCCH with the DCI format 1_0) is transmitted only in the PDCCH candidates of the second type among the PDCCH candidates of the first type of CSS and the PDCCH candidates of the second type of CSS. Here, the terminal apparatus 1 may not need to monitor the PDCCH with the DCI format 1_0 in the PDCCH candidates of the first type of CSS.

(Process G3): The terminal apparatus 1 regards that the PDCCH with the DCI format 1_0) is transmitted or received in the PDCCH candidates of the second type of CSS rather than in the PDCCH candidates of the first type of CSS when it detects the PDCCH with the DCI format 1_0) in the PDCCH candidates of the first type of CSS.

(Process G4): The terminal apparatus 1 regards that the PDCCH with the DCI format 1_0) is transmitted or received in the PDCCH candidates of the first type of CSS rather than in the PDCCH candidates of the second type of CSS when it detects the PDCCH with the DCI format 1_0 in the PDCCH candidates of the second type of CSS.

If the condition F is not satisfied, the terminal apparatus 1 regards that the PDCCH with the DCI format 1_0 may be transmitted in any PDCCH candidate of the PDCCH candidates of the first type of CSS and the PDCCH candidates of the second type of CSS. If the condition F is not satisfied, the terminal apparatus 1 may monitor both of the PDCCH candidates of the first type of CSS and the PDCCH candidates of the second type of CSS.

Therefore, when the condition F is satisfied, the base station apparatus 3 may perform any one of the following processes H1 to H4 for the PDCCH candidate of the first type of CSS and the PDCCH candidate of the second type of CSS under the condition F. That is, the base station apparatus 3 may determine whether to perform any one of the following processes H1 to H4 based on whether the condition F is satisfied.

(Process H1): The base station apparatus 3 transmits the PDCCH with the DCI format 1_0 only in the PDCCH candidates of the first type of CSS among the PDCCH candidates of the first type of CSS and the PDCCH candidates of the second type of CSS.

(Process H2): The base station apparatus 3 transmits the PDCCH with the DCI format 1_0 in the PDCCH candidates of the second type among the PDCCH candidates of the first type of CSS and the PDCCH candidates of the second type of CSS.

(Process H3): The base station apparatus 3 regards that the PDCCH with the DCI format 1_0 is transmitted in the PDCCH candidates of the second type of CSS rather than in the PDCCH candidates of the first type of CSS when it transmits the PDCCH with the DCI format 1_0) in the PDCCH candidates of the first type of CSS.

(Process H4): The base station apparatus 3 regards that the PDCCH with the DCI format 1_0) is transmitted in the PDCCH candidates of the first type of CSS rather than in the PDCCH candidates of the second type of CSS when it transmits the PDCCH with the DCI format 1_0 in the PDCCH candidates of the second type of CSS.

If the condition F is not satisfied, the base station apparatus 3 may transmit the PDCCH with the DCI format 1_0 in any one of the PDCCH candidates of the first type of CSS and the PDCCH candidates of the second type of CSS.

Accordingly, when the condition F is satisfied, the terminal apparatus 1 may correctly determine which of the PDCCH candidate of the first type of CSS and the PDCCH candidate of the second type of CSS under the condition F has transmitted the PDCCH.

The CSS of the condition C may be a first type of CSS and/or a second type of CSS. When both the condition C and the condition F are satisfied, the terminal apparatus 1 may perform any one of the processes G1 to G4 after performing the process D1 or the process D3.

Hereinafter, various aspects of the terminal apparatus 1 and the base station apparatus 3 in the present embodiment will be described.

(1) A first aspect of the present embodiment is a terminal apparatus 1 that comprises at least one processor and a memory coupled to the at least one processor, the processor is configured to receive at least one PDCCH with a DCI format and receive a PDSCH corresponding to an RIV configured in a "frequency domain resource assignment" field of the DCI format, and the RIV is given at least based on a type of search space in which the PDCCH is detected: and in a case where (1) the terminal apparatus is configured to monitor a first PDCCH candidate in a CSS and a second PDCCH candidate in a USS according to the DCI format with C-RNTI. (2) a set of resource elements constituting the first PDCCH candidate is the same as a set of resource elements constituting the second PDCCH. (3) a higher layer parameter PDCCH-DMRS-Scrambling-ID is not configured, and/or (4) the size of the DCI format corresponding to the first PDCCH candidate is the same as the size of the DCI format corresponding to the second PDCCH candidate, the processor is configured to regard that the PDCCH with the DCI format is transmitted only in the first PDCCH candidate of the first PDCCH candidate and the second PDCCH candidate, or regard that the PDCCH with the DCI format is transmitted only in the second PDCCH candidate of the first PDCCH candidate and the second PDCCH candidate, or regard that the PDCCH with the DCI format is transmitted or received in the second PDCCH candidate when the processor receives the PDCCH with the DCI format in the first PDCCH candidate, or regard that the PDCCH with the DCI format is transmitted or received in the first PDCCH candidate when the processor receives the PDCCH with the DCI format in the second PDCCH candidate.

(2) A second aspect of the present embodiment is a base station apparatus 3 that comprises at least one processor and a memory coupled to the at least one processor, the processor is configured to transmit at least one PDCCH with a DCI format and transmit a PDSCH corresponding to an RIV configured in a "frequency domain resource assignment" field of the DCI format, and the RIV is given at least based on a type of search space in which the PDCCH is detected: and in a case where (1) the terminal apparatus is configured to monitor a first PDCCH candidate in a CSS and a second PDCCH candidate in a USS according to the DCI format with C-RNTI. (2) a set of resource elements constituting the first PDCCH candidate is the same as a set of resource elements constituting the second PDCCH. (3) a higher layer parameter PDCCH-DMRS-Scrambling-ID is not configured, and/or (4) the size of the DCI format corresponding to the first PDCCH candidate is the same as the size of the DCI format corresponding to the second PDCCH candidate, the processor is configured to transmit the PDCCH with the DCI format only in the first PDCCH candidate of the first PDCCH candidate and the second PDCCH candidate, or transmit the PDCCH with the DCI format only in the second PDCCH candidate of the first PDCCH candidate and the second PDCCH candidate, or regard that the PDCCH with the DCI format is transmitted in the second PDCCH candidate when the processor transmits the PDCCH with the DCI format in the first PDCCH candidate, or regard that the PDCCH with the DCI format is transmitted in the first PDCCH candidate when the processor transmits the PDCCH with the DCI format in the second PDCCH candidate.

(3) In the first and second aspects of the present embodiment, a CORESET corresponding to the first PDCCH candidate is the same as a CORESET corresponding to the second PDCCH candidate.

(4) In the first and second aspects of the present embodiment, a set of fields of the DCI format corresponding to the first PDCCH candidate is the same as a set of fields of the DCI format corresponding to the second PDCCH candidate.

(5) In the first and second aspects of the present embodiment, the DCI format is DCI format 0)_0) and/or DCI format 1_0).

(6) In the first and second aspects of the present embodiment, a scrambling sequence $C_{PDCCH}(i)$ for scrambling the PDCCH may be initialized by using $C_{PDCCH\_init}$, the $C_{PDCCH\_init}$ may be given at least based on $n_{RNTI}$: and in a case where a higher layer parameter PDCCH-DMRS-Scrambling-ID is configured, the $n_{RNTI}$ is C-RNTI for the PDCCH in the USS: otherwise, the $n_{RNTI}$ is 0, and the C-RNTI is a value different from 0.

Accordingly, the terminal apparatus 1 and the base station apparatus 3 can communicate efficiently.

A program running on the base station apparatus 3 and the terminal apparatus 1 according to the present invention may be a program that controls a CPU (Central Processing Unit) and the like to implement the functions of the above-mentioned embodiment according to the present invention (that is, a program that causes a computer to function). Then, the information processed by these apparatuses is temporarily stored in RAM (Random Access Memory) while being processed, then stored in various types of ROM (Read Only Memory) such as a Flash ROM and HDD (Hard Disk Drive), and read, modified or rewritten by the CPU as necessary.

It should be noted that the terminal apparatus 1 and the base station apparatus 3 according to the above embodiment may be partially achieved by a computer. In that case, it may be realized by recording a program for realizing the control function on a computer-readable recording medium, and causing a computer system to read the program recorded on the recording medium for execution.

It should be noted that the "computer system" mentioned here indicates a computer system built into the terminal apparatus 1 or the base station apparatus 3, and the computer system may include an OS and hardware components such as a peripheral apparatus. Besides, the "computer-readable recording medium" indicates a portable medium such as a flexible disk, a magneto-optical disk, a ROM, a CD-ROM, and the like, and a storage apparatus such as a hard disk built into the computer system.

Also, the "computer-readable recording medium" may include a recording medium for dynamically storing programs for a short time, such as a communication line in the case of transmitting the programs via a network such as the internet or a communication line such as a telephone line, and may include a recording medium for storing the programs for a fixed period of time, such as a volatile memory within a computer system of a server or a client in such a case. Besides, the above-mentioned program may be configured to realize some of the functions described above, and also may be configured to be capable of realizing the functions described above in combination with a program already recorded in the computer system.

Furthermore, the base station apparatus 3 according to the above-mentioned embodiment may be implemented as an aggregation (apparatus group) including multiple apparatuses. Each of the apparatuses constituting such an apparatus group may include some or all portions of each function or each functional block of the base station apparatus 3 according to the above-mentioned embodiment. The apparatus group may be required to have each general function or each functional block of the base station apparatus 3. Furthermore, the terminal apparatus 1 according to the above-mentioned embodiment can also communicate with a base station apparatus implemented as aggregation.

Moreover, the base station apparatus 3 according to the above-mentioned embodiment may serve as an EUTRAN (Evolved Universal Terrestrial Radio Access Network). Besides, the base station apparatus 3 according to the above-mentioned embodiment may have some or all portions of the functions for a node higher than an eNodeB.

In addition, some or all portions of each of the terminal apparatus 1 and the base station apparatus 3 according to the above-mentioned embodiment may be implemented as an LSI typically functioning as an integrated circuit or may be implemented as a chip set. Each of the functional blocks of the terminal apparatus 1 and the base station apparatus 3 may be individually implemented as a chip, or some or all of the functional blocks of the same may be integrated into a chip. Besides, a circuit integration technique is not limited to the LSI, and may be implemented with a dedicated circuit or a general-purpose processor. Furthermore, with the advance in semiconductor technology, a circuit integration technology may appear to replace the LSI technology, and an integrated circuit based on such a technology may also be used.

Moreover, according to the above-mentioned embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an AV apparatus, a kitchen apparatus, a cleaning/washing apparatus, an air-conditioning apparatus, an office apparatus, a vending machine, and other household apparatuses.

The embodiments of the present invention have been described in detail with reference to the accompanying drawings, but the specific configuration is not limited to the present embodiment, but also includes design changes and the like without departing from the scope of the present invention. In addition, various modifications within the scope presented by the aspects of the present disclosure may be made to the present invention, and embodiments obtained by suitably combining technical means disclosed by the different embodiments may also be included in the technical scope of the present invention. Furthermore, a configuration in which constituent elements, described in the respective embodiments and having mutually the same effects, are substituted for one another may be also included in the technical scope of the present invention.

What is claimed is:

1. A terminal apparatus, comprising:
at least one processor; and
at least one memory coupled to the at least one processor, the at least one memory storing one or more computer-executable instructions that, when executed by the at least one processor, cause the terminal apparatus to:
receive at least one physical downlink control channel (PDCCH) with a downlink control information (DCI) format; and
receive a physical downlink shared channel (PDSCH) corresponding to a resource indication value (RIV) that is configured in a "frequency domain resource assignment" field of the DCI format and that is given at least based on a type of search space in which the PDCCH is detected, wherein in a case that the terminal apparatus is configured to monitor a first PDCCH candidate in a common search space (CSS) and a second PDCCH candidate in a user equipment specific search space (USS) according to the DCI format with a cell radio network temporary identifier (C-RNTI),
a set of control channel elements (CCEs) constituting the first PDCCH candidate is the same as a set of CCEs constituting the second PDCCH candidate,
a scrambling sequence for the first PDCCH candidate is the same as a scrambling sequence for the second PDCCH candidate,
a size of the DCI format corresponding to the first PDCCH candidate is the same as a size of the DCI format corresponding to the second PDCCH candidate, and
the computer-executable instructions, when executed by the at least one processor, further cause the terminal apparatus to monitor the PDCCH with the DCI format only on the first PDCCH candidate in the CSS among the first PDCCH candidate in the CSS and the second PDCCH candidate in the USS.

2. The terminal apparatus according to claim 1, wherein a control resource set (CORESET) corresponding to the first PDCCH candidate is the same as a CORESET corresponding to the second PDCCH candidate.

3. The terminal apparatus according to claim 1, wherein a set of fields of the DCI format corresponding to the first PDCCH candidate is the same as a set of fields of the DCI format corresponding to the second PDCCH candidate.

4. The terminal apparatus according to claim 1, wherein the DCI format is a DCI format 0_0 or a DCI format 1_0.

5. The terminal apparatus according to claim 1, wherein:
a scrambling sequence $C_{PDCCH}$ (i) for scrambling the PDCCH is initialized by using $C_{PDCCH\_init}$;
the $C_{PDCCH\_init}$ is given at least based on $n_{RNTI}$;
in a case that the higher layer parameter PDCCH-demodulation reference signal (DMRS)-Scrambling-ID is configured, the $n_{RNTI}$ is given by the C-RNTI for the PDCCH in the USS;
in a case that the higher layer parameter PDCCH-DMRS-Scrambling-ID is not configured, the $n_{RNTI}$ is 0; and
the C-RNTI is a value different from 0.

6. A base station apparatus, comprising:
at least one processor; and
at least one memory coupled to the at least one processor, the at least one memory storing one or more computer-executable instructions that, when executed by the at least one processor, cause the base station apparatus to:
transmit at least one physical downlink control channel (PDCCH) with a downlink control information (DCI) format; and
transmit a physical downlink shared channel (PDSCH) corresponding to a resource indication value (RIV) that is configured in a "frequency domain resource assignment" field of the DCI format and that is given at least based on a type of search space in which the PDCCH is detected, wherein in a case that a terminal apparatus is configured to monitor a first PDCCH candidate in a common search space (CSS) and a second PDCCH candidate in a user equipment specific search space (USS) according to the DCI format with a cell radio network temporary identifier (C-RNTI),
a set of control channel elements (CCEs) constituting the first PDCCH candidate is the same as a set of CCEs constituting the second PDCCH candidate,
a scrambling sequence for the first PDCCH candidate is the same as a scrambling sequence for the second PDCCH candidate,
a size of the DCI format corresponding to the first PDCCH candidate is the same as a size of the DCI format corresponding to the second PDCCH candidate, and
the computer-executable instructions, when executed by the at least one processor, further cause the base station apparatus to transmit the PDCCH with the DCI format only on the first PDCCH candidate in the CSS among the first PDCCH candidate in the CSS and the second PDCCH candidate in the USS.

7. The base station apparatus according to claim 6, wherein a control resource set (CORESET) corresponding to the first PDCCH candidate is the same as a CORESET corresponding to the second PDCCH candidate.

8. The base station apparatus according to claim 6, wherein a set of fields of the DCI format corresponding to the first PDCCH candidate is the same as a set of fields of the DCI format corresponding to the second PDCCH candidate.

9. The base station apparatus according to claim 6, wherein the DCI format is a DCI format 0_0 or a DCI format 1_0.

10. The base station apparatus according to claim 6, wherein:
a scrambling sequence $C_{PDCCH}$ (i) for scrambling the PDCCH is initialized by using $C_{PDCCH\_init}$;
the $C_{PDCCH\_init}$ is given at least based on $n_{RNTI}$;
in a case that the higher layer parameter PDCCH-demodulation reference signal (DMRS)-Scrambling-ID is configured, the $n_{RNTI}$ is given by the C-RNTI for the PDCCH in the USS;
in a case that the higher layer parameter PDCCH-DMRS-Scrambling-ID is not configured, the $n_{RNTI}$ is 0; and
the C-RNTI is a value different from 0.

11. A communication method performed by a terminal apparatus, the communication method comprising:

receiving a physical downlink control channel (PDCCH) with a downlink control information (DCI) format; and receiving a physical downlink shared channel (PDSCH) corresponding to a resource indication value (RIV) that is configured in a "frequency domain resource assignment" field of the DCI format and that is given at least based on a type of search space in which the PDCCH is detected, wherein in a case that the terminal apparatus is configured to monitor a first PDCCH candidate in a common search space (CSS) and a second PDCCH candidate in a user equipment specific search space (USS) according to the DCI format with a cell radio network temporary identifier (C-RNTI), a set of control channel elements (CCEs) constituting the first PDCCH candidate is the same as a set of CCEs constituting the second PDCCH candidate, a scrambling sequence for the first PDCCH candidate and is the same as a scrambling sequence for the second PDCCH candidate, a size of the DCI format corresponding to the first PDCCH candidate is the same as a size of the DCI format corresponding to the second PDCCH candidate, and the communication method further comprises monitoring the PDCCH with the DCI format only on the first PDCCH candidate in the CSS among the first PDCCH candidate in the CSS and the second PDCCH candidate in the USS.

12. The communication method according to claim 11, wherein a control resource set (CORESET) corresponding to the first PDCCH candidate is the same as a CORESET corresponding to the second PDCCH candidate.

13. The communication method according to claim 11, wherein a set of fields of the DCI format corresponding to the first PDCCH candidate is the same as a set of fields of the DCI format corresponding to the second PDCCH candidate.

14. The communication method according to claim 11, wherein the DCI format is a DCI format 0_0 or a DCI format 1_0.

15. The communication method according to claim 11, wherein:

a scrambling sequence $C_{PDCCH}$ (i) for scrambling the PDCCH is initialized by using $C_{PDCCH\_init}$;

the $C_{PDCCH\_init}$ is given at least based on $n_{RNTI}$;

in a case that the higher layer parameter PDCCH-demodulation reference signal (DMRS)-Scrambling-ID is configured, the $n_{RNTI}$ is given by the C-RNTI for the PDCCH in the USS;

in a case that the higher layer parameter PDCCH-DMRS-Scrambling-ID is not configured, the $n_{RNTI}$ is 0; and the C-RNTI is a value different from 0.

* * * * *